(12) United States Patent
Maeda et al.

(10) Patent No.: US 12,301,989 B2
(45) Date of Patent: May 13, 2025

(54) ELECTRONIC APPARATUS, CAMERA, AND PROGRAM FOR SELECTING FEATURES ON AN IMAGE

(71) Applicant: NIKON CORPORATION, Tokyo (JP)

(72) Inventors: Toshiaki Maeda, Yokohama (JP); Yuki Kita, Kawasaki (JP); Noriyoshi Tachikawa, Kawasaki (JP); Tetsuto Kawazu, Kawasaki (JP); Hiroshi Takeuchi, Tokyo (JP); Ikuya Saito, Kawasaki (JP); Toru Kijima, Yokohama (JP); Masayuki Saito, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 544 days.

(21) Appl. No.: 17/418,096

(22) PCT Filed: Dec. 27, 2019

(86) PCT No.: PCT/JP2019/051616
§ 371 (c)(1),
(2) Date: Oct. 21, 2021

(87) PCT Pub. No.: WO2020/138497
PCT Pub. Date: Jul. 2, 2020

(65) Prior Publication Data
US 2022/0086361 A1    Mar. 17, 2022

(30) Foreign Application Priority Data
Dec. 28, 2018   (JP) .................................. 2018-248622

(51) Int. Cl.
*H04N 23/67*    (2023.01)
*H04N 23/611*   (2023.01)
*H04N 23/63*    (2023.01)

(52) U.S. Cl.
CPC ......... *H04N 23/675* (2023.01); *H04N 23/611* (2023.01); *H04N 23/635* (2023.01)

(58) Field of Classification Search
None
See application file for complete search history.

(56) References Cited

U.S. PATENT DOCUMENTS

2005/0174451 A1*   8/2005   Nozaki ............... H04N 23/611
                                              348/240.99
2008/0317285 A1*  12/2008   Abe .................... H04N 23/62
                                              382/103

(Continued)

FOREIGN PATENT DOCUMENTS

| JP | 2001-215403 A | 8/2001 |
| JP | 2015-096961 A | 5/2015 |
| JP | 7211432 B2    | 1/2023 |

OTHER PUBLICATIONS

Mar. 3, 2020 International Search Report issued in International Patent Application No. PCT/JP2019/051616.

(Continued)

*Primary Examiner* — Paul M Berardesca
(74) *Attorney, Agent, or Firm* — Oliff PLC

(57) ABSTRACT

An electronic apparatus includes a detection unit that detects eyes from an image, a selection unit that selects one eye from the eyes detected by the detection unit, an operation unit that accepts an operation of causing the selection unit to select an eye different from the selected eye, and a display unit that displays an indication superimposed on an image indicating that the eye is selected by the selection unit.

12 Claims, 16 Drawing Sheets

(56) References Cited

U.S. PATENT DOCUMENTS

| | | | | |
|---|---|---|---|---|
| 2010/0033592 A1* | 2/2010 | Oyama | ............... | H04N 23/611 |
| | | | | 348/222.1 |
| 2012/0147252 A1* | 6/2012 | Kunishige | ............ | H04N 23/667 |
| | | | | 348/E5.045 |
| 2016/0295100 A1* | 10/2016 | Yokozeki | ............. | H04N 23/635 |
| 2017/0064188 A1* | 3/2017 | Yoshida | ............... | H04N 23/611 |
| 2019/0116311 A1* | 4/2019 | Sato | ....................... | H04N 23/80 |
| 2019/0116312 A1* | 4/2019 | Funatsu | ............... | H04N 23/663 |
| 2021/0067685 A1* | 3/2021 | Ishii | ..................... | H04N 23/611 |
| 2021/0157400 A1* | 5/2021 | Funatsu | ............... | G06V 40/165 |
| 2022/0086361 A1 | 3/2022 | Maeda et al. | | |

OTHER PUBLICATIONS

Mar. 3, 2020 Written Opinion of the International Searching Authority issued in International Patent Application No. PCT/JP2019/051616.

Sep. 15, 2022 Office Action Issued in Chinese Patent Application No. 201980091466.8.

Apr. 1, 2023 Office Action issued in Chinese Patent Application No. 201980091466.8.

Aug. 2, 2022 Office Action issued in Japanese Patent Application No. 2020-562552.

Mar. 25, 2025 Office Action issued in Japanese Patent Application No. 2024-001773.

* cited by examiner

FIG. 10
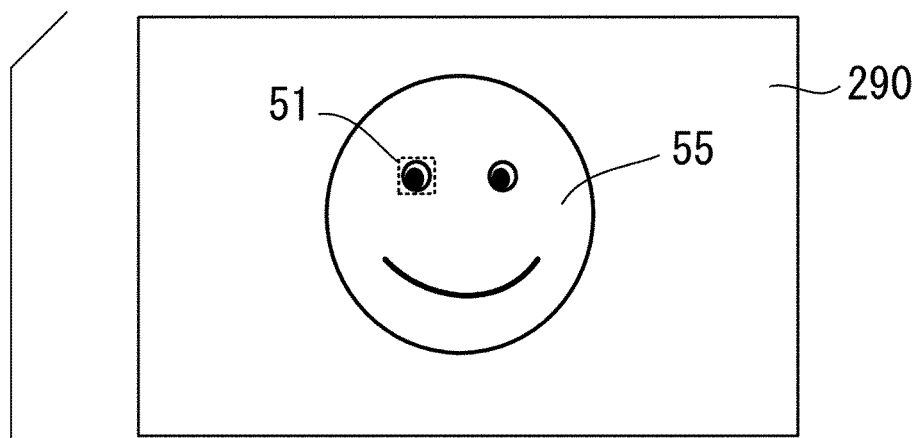
(a)
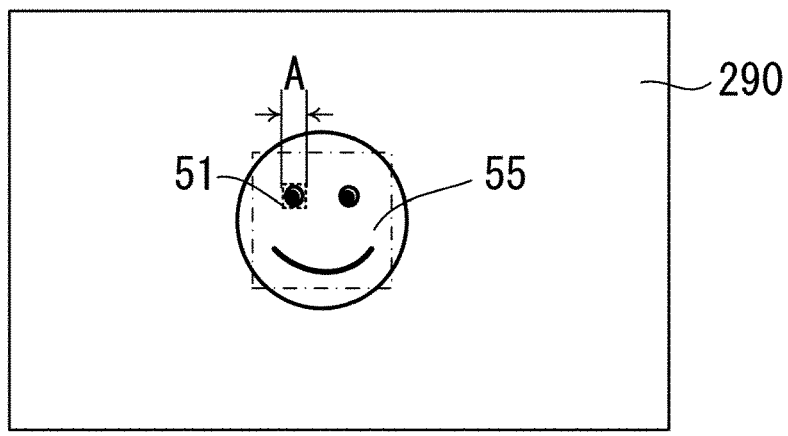
(b)
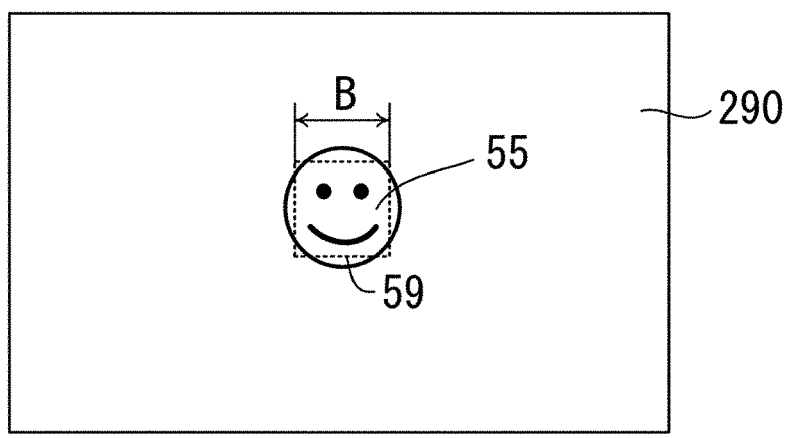
(c)

ELECTRONIC APPARATUS, CAMERA, AND PROGRAM FOR SELECTING FEATURES ON AN IMAGE

TECHNICAL FIELD

The present invention relates to an electronic apparatus, a camera, and a program.

BACKGROUND ART

A camera that detects a face of a subject, further detects an eye of the face, and performs control to focus on the eye is known (see Patent Literature 1). Since the past, the improvement of focusing accuracy has been required.

CITATION LIST

Patent Literature

[Patent Literature 1]
  Japanese Patent Application, Publication No. 2001-215403

SUMMARY OF INVENTION

According to a first aspect of the present invention, an electronic apparatus is provided including: a detection unit that detects eyes from an image; a selection unit that selects one eye from the eyes detected by the detection unit; an operation unit that accepts an operation of causing the selection unit to select an eye different from the selected eye; and a display unit that displays an indication superimposed on an image and indicating that the eye is selected by the selection unit.

According to a second aspect of the present invention, an electronic apparatus is provided including: a detection unit that detects eyes from an image; a display unit that displays an indication superimposed on an image and indicating one eye among the eyes detected by the detection unit; and an operation unit that performs an operation of changing the indication indicating the one eye displayed on the display unit to an indication indicating a different eye detected by the detection unit.

According to a third aspect of the present invention, an electronic apparatus is provided including: a detection unit that detects eyes and faces from an image; a selection unit that selects one eye from the eyes detected by the detection unit; and a display unit that displays, superimposed on an image, a first indication indicating a position of the eye selected by the selection unit and a second indication indicating that at least any of a face and an eye different from the selected eye is detected by the detection unit.

According to a fourth aspect of the present invention, an electronic apparatus is provided including: a detection unit that detects first feature portions and second feature portions from an image; a selection unit that selects one of the first feature portions from the first feature portions detected by the detection unit; and a display unit that displays a first indication indicating the first feature portion selected by the selection unit and a second indication indicating information relating to a direction in which the first feature portion or the second feature portion that is capable of being selected in addition to the selected first feature portion is located, and makes a form of the second indication different in a case where the first feature portion that is capable of being selected is detected and a case where the second feature portion that is capable of being selected is detected.

According to a fifth aspect of the present invention, a camera is provided that is the electronic apparatus according to the first to third aspects.

According to a sixth aspect of the present invention, a camera is provided including: an imaging unit that captures an image of a subject using a flux of light transmitted through an optical system and outputs a signal; an image generation unit that generates an image on the basis of the signal; a detection unit that detects faces and eyes from the image; an image forming state detection unit that detects an image forming state of an image using the optical system; a display unit that displays an indication superimposed on an image and corresponding to a position and size of the eye detected by the detection unit; and a control unit that selects whether to control the optical system on the basis of the image forming state in a region corresponding to the position and size of the eye detected by the detection unit or to control the optical system on the basis of the image forming state in a region corresponding to a position and size of a face having the eye detected by the detection unit, on the basis of a size of the detected eye.

According to a seventh aspect of the present invention, a program is provided causing a computer to execute: a detection process of detecting eyes from an image; a selection process of selecting one eye from the detected eyes; an acceptance process of accepting an operation for selecting an eye different from the eye selected in the selection process; and a display process of superimposing an indication indicating that the eye is selected in the selection process on an image and displaying it on a display unit.

Figure 4:
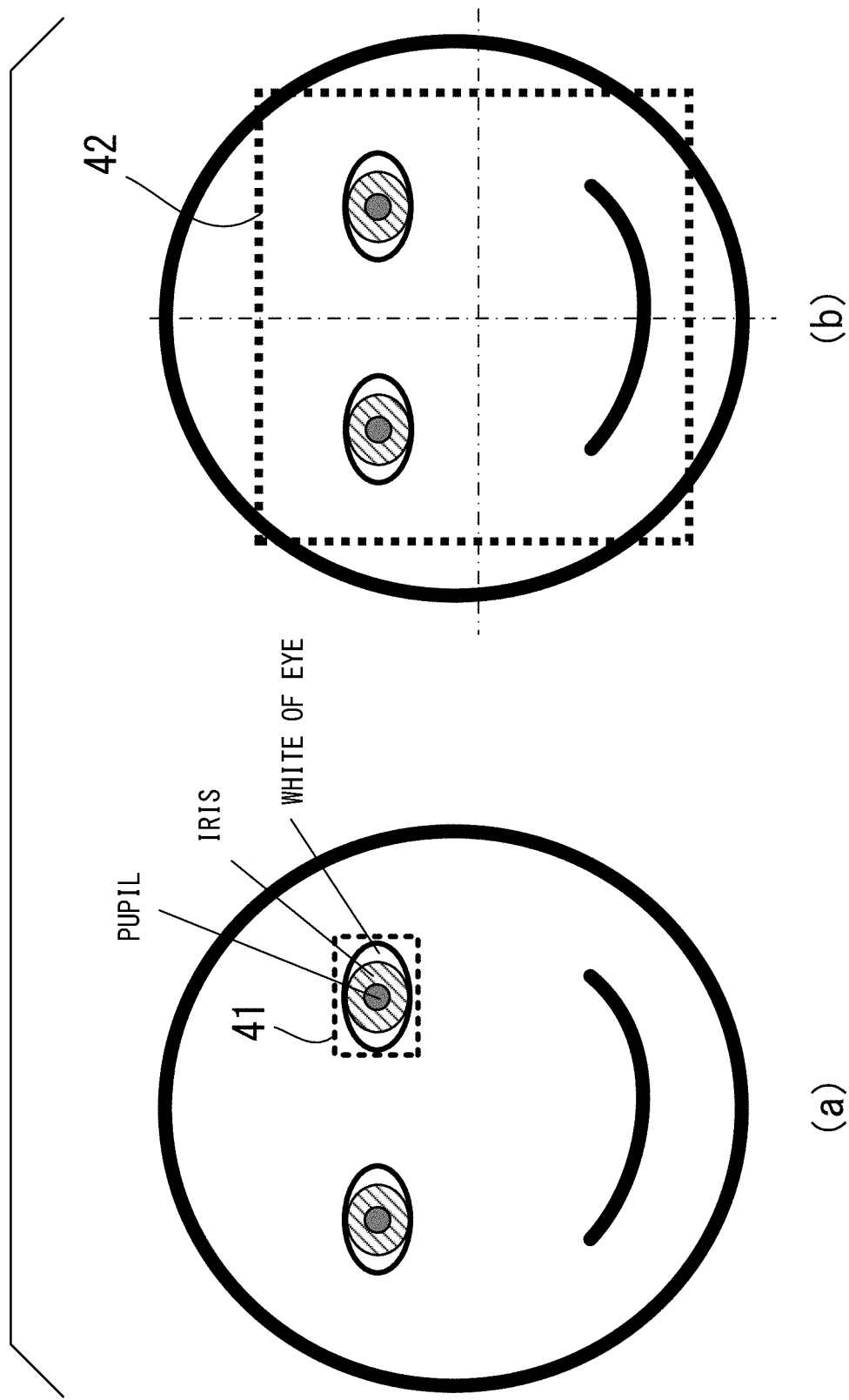

Part (a) of FIG. 4 shows a diagram illustrating an indication frame indicating a detected eye, and part (b) of FIG. 4 shows a diagram illustrating an indication frame indicating a detected face.

Figure 5:
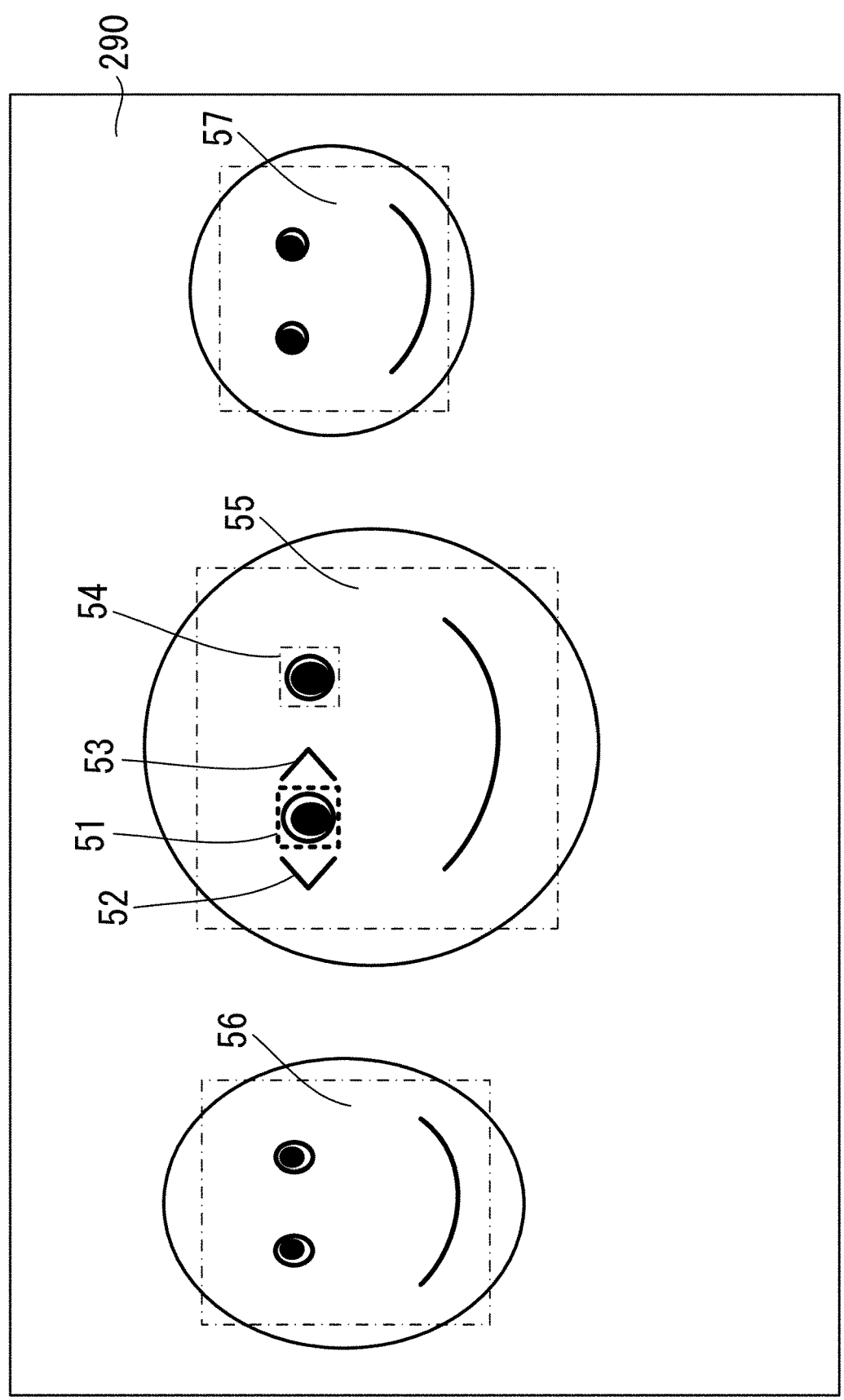

FIG. 5 is a diagram illustrating a case where a plurality of eyes or faces are detected.

Figure 6:
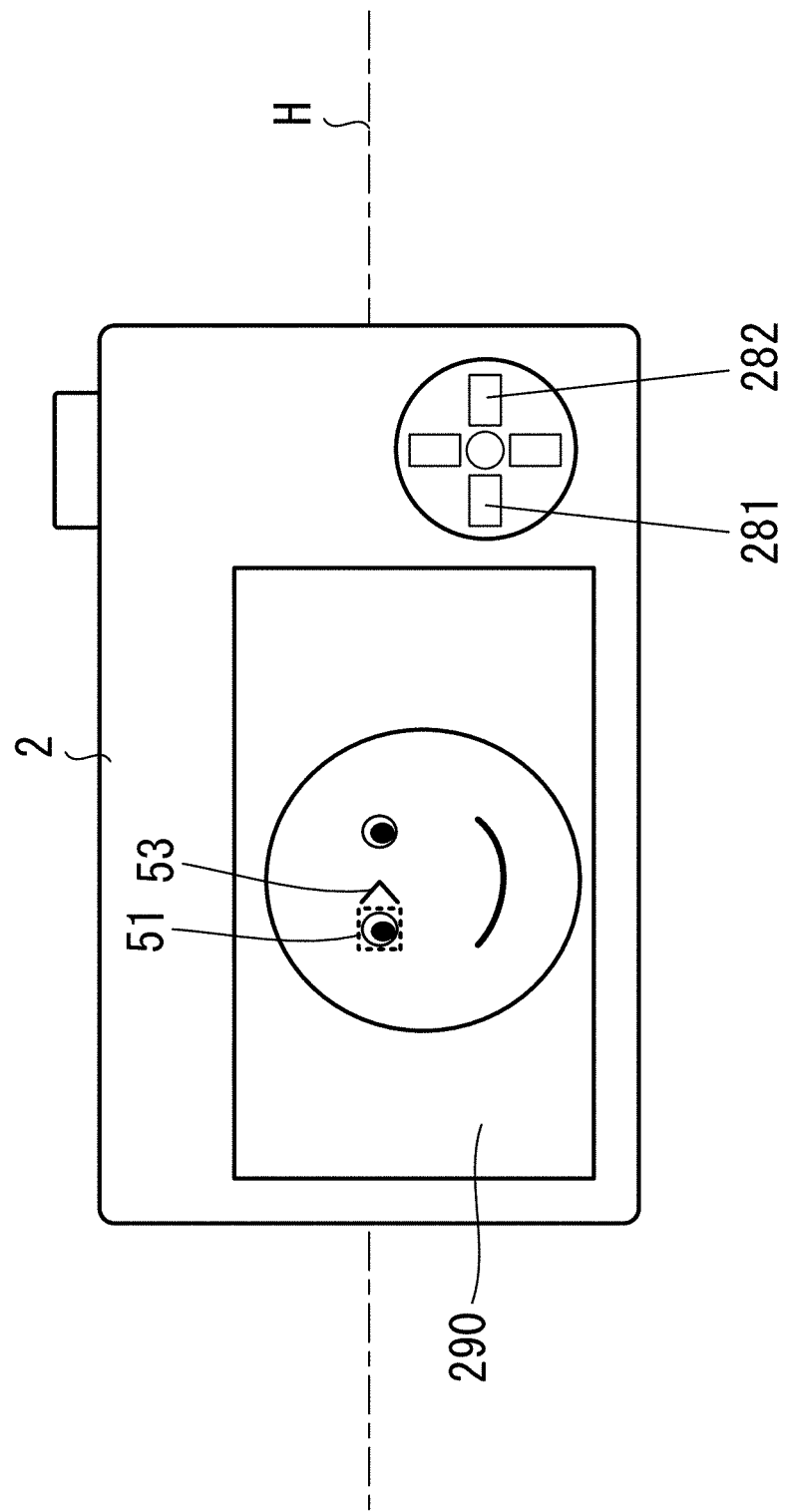

FIG. 6 is a diagram illustrating an exterior surface on the backside of a camera body in a case where it is held in a horizontal position.

Figure 7:
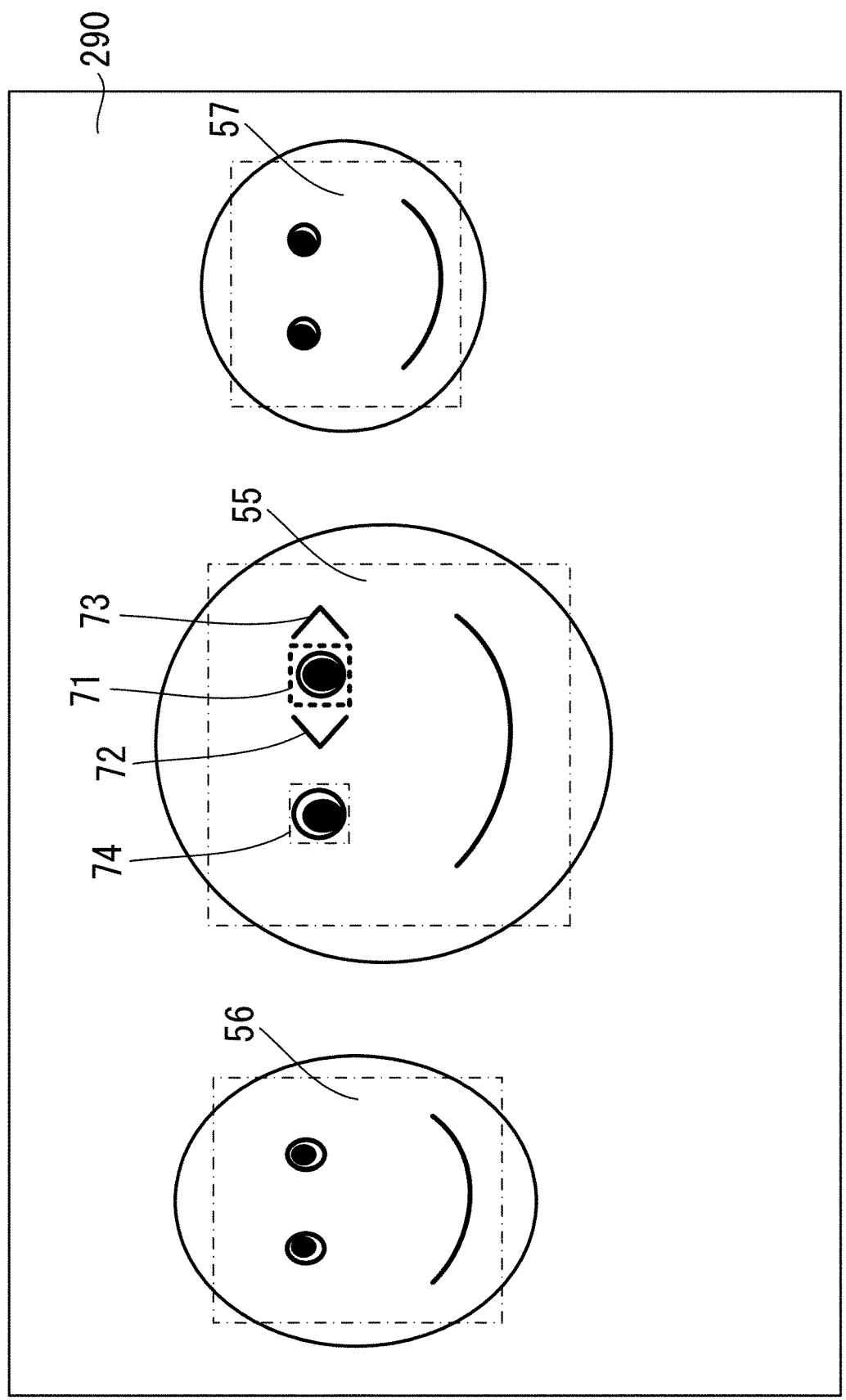

FIG. 7 is a diagram illustrating a case where an eye located on the right side of the indication frame of the face of FIG. 5 is selected.

Figure 8:
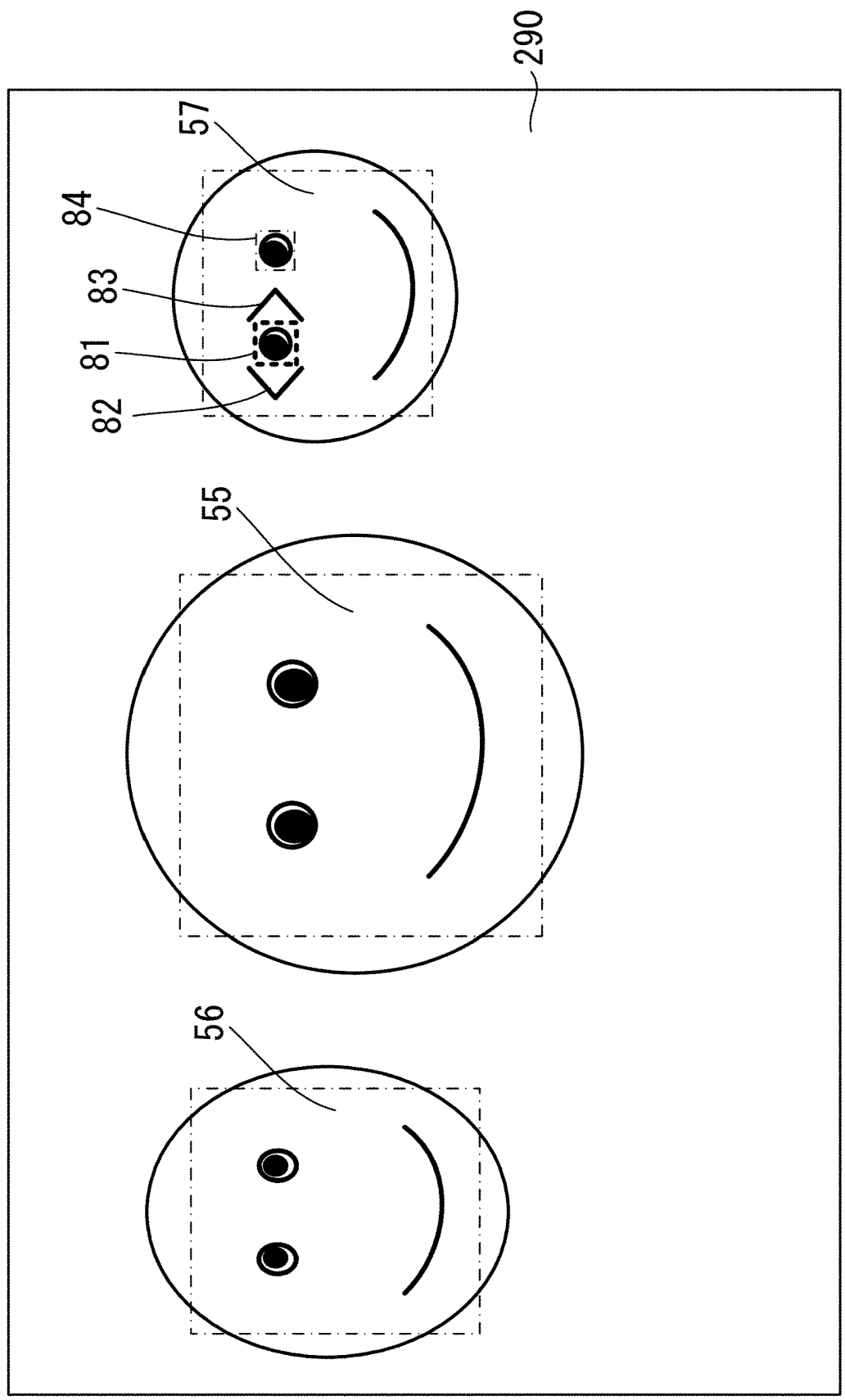

FIG. 8 is a diagram illustrating a case where an eye of a face located on the right side of the indication frame of the face of FIG. 7 is selected.

Figure 9:
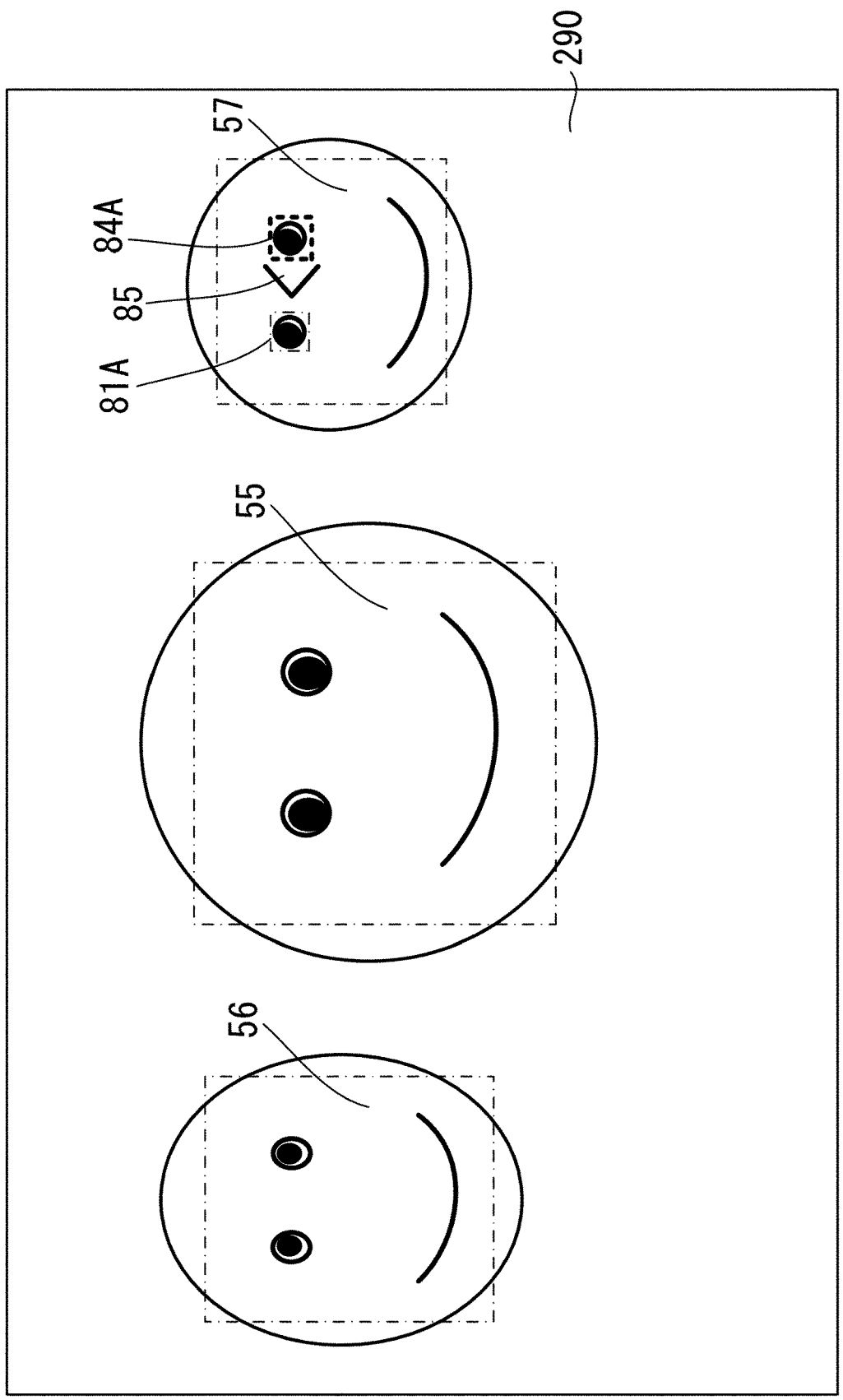

FIG. 9 is a diagram illustrating another example of a case where an eye of a face located on the right side of the indication frame of the face of FIG. 7 is selected.

Parts (a) to (c) of FIG. 10 shows diagrams illustrating a relationship between the size of an eye or a face in an image and an indication frame.

Figure 11:
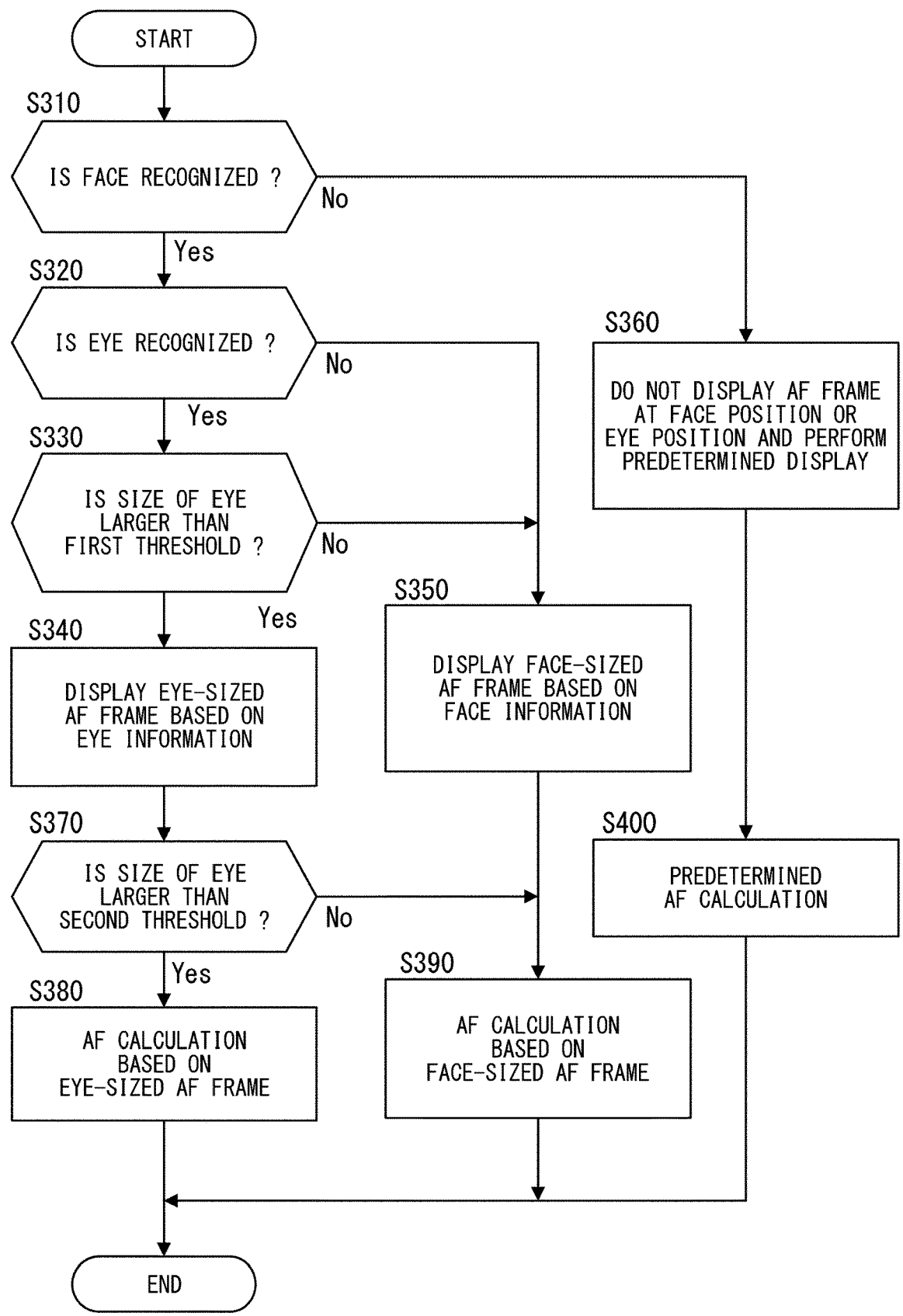

FIG. 11 is a flowchart illustrating a flow of processes of determining an indication frame in a case where a first setting is selected in a first embodiment.

Figure 12:
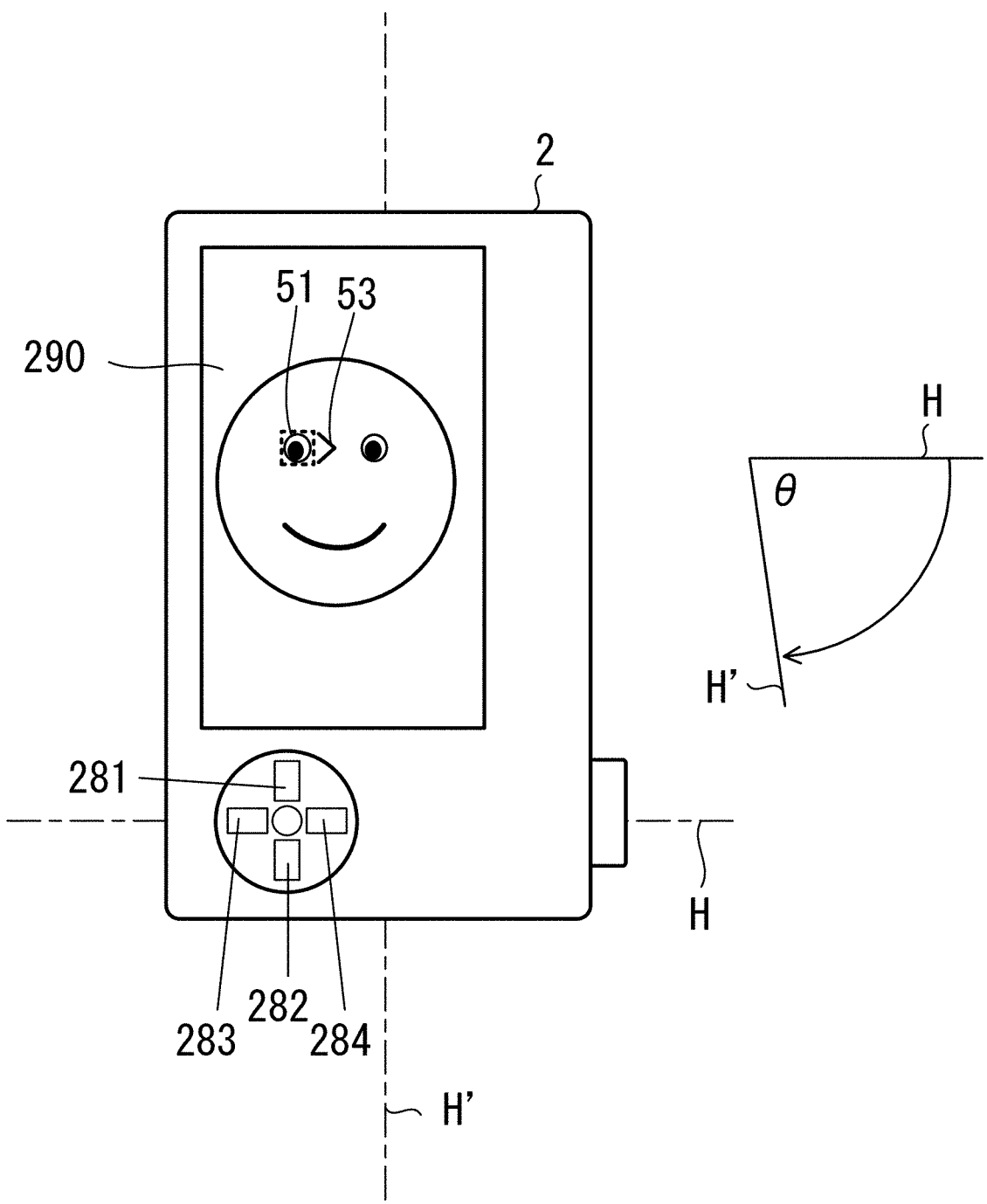

FIG. 12 is a diagram illustrating an exterior surface of the backside of the camera body in a case where it is held in a vertical position.

Figure 13:
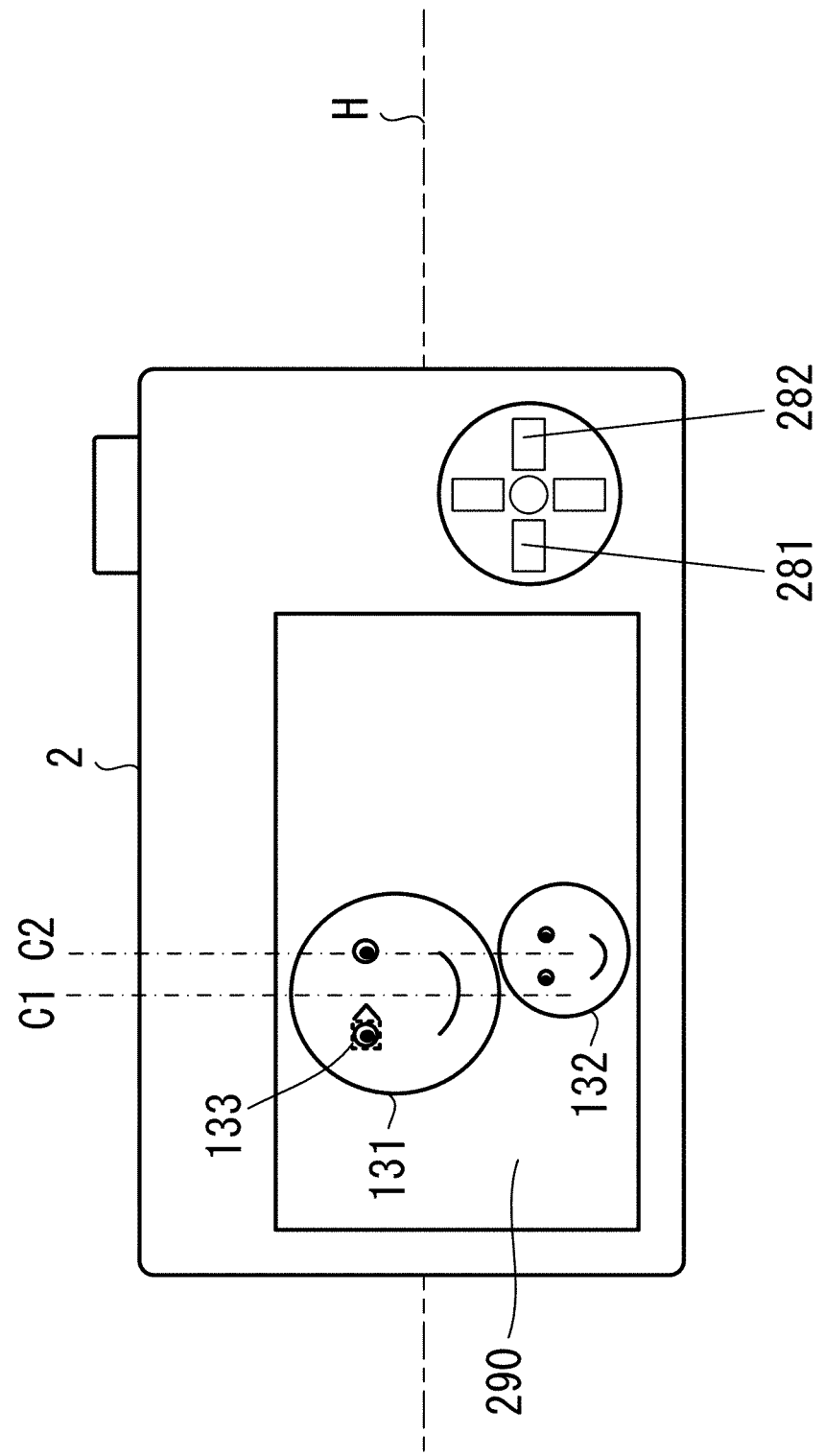

FIG. 13 is a diagram illustrating a state in which a plurality of faces are lined up in a Y-axis direction (vertical direction).

Figure 14:
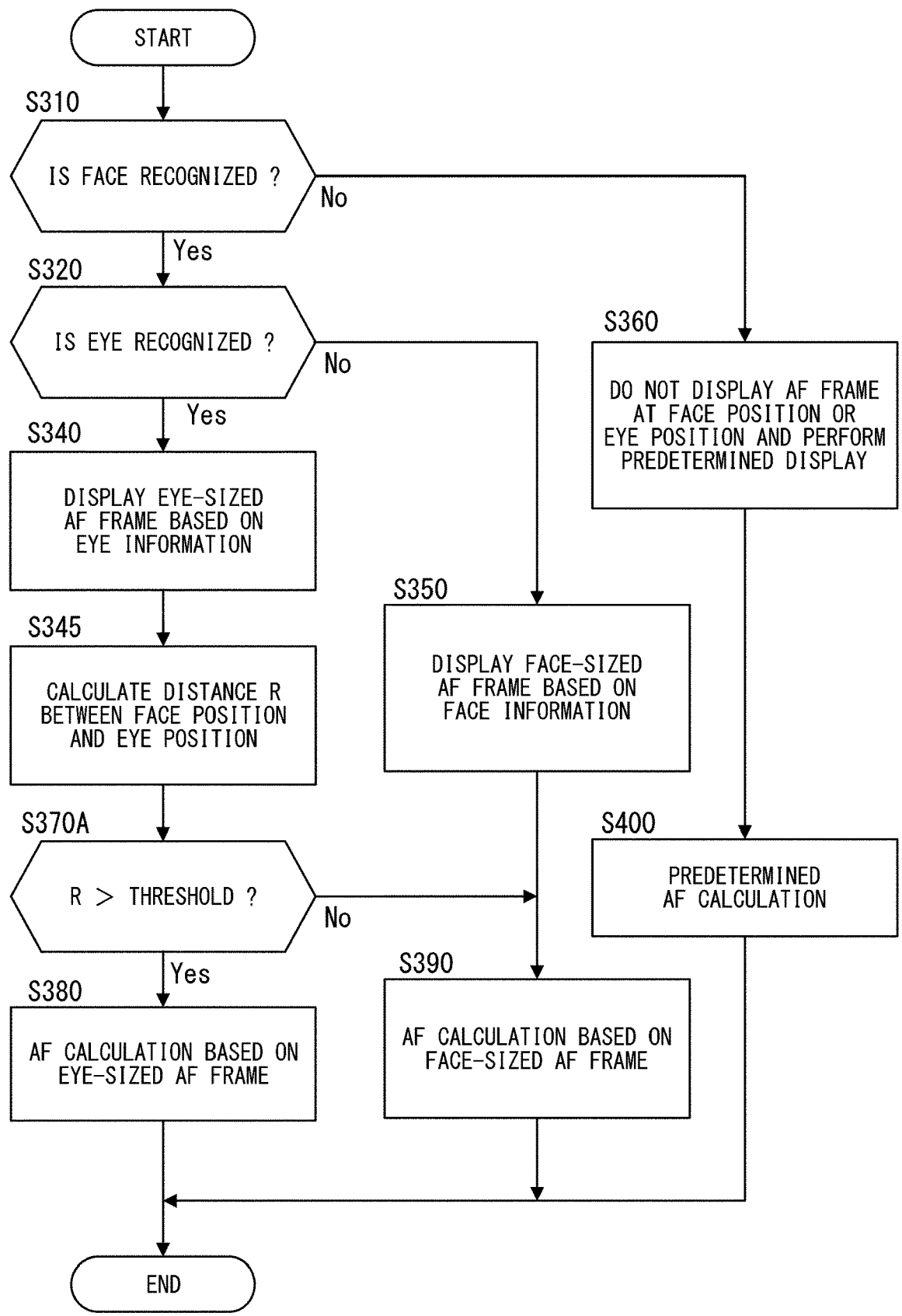

FIG. 14 is a flowchart illustrating a flow of processes of determining an indication frame in a case where a first setting is selected in a second embodiment.

Figure 15:
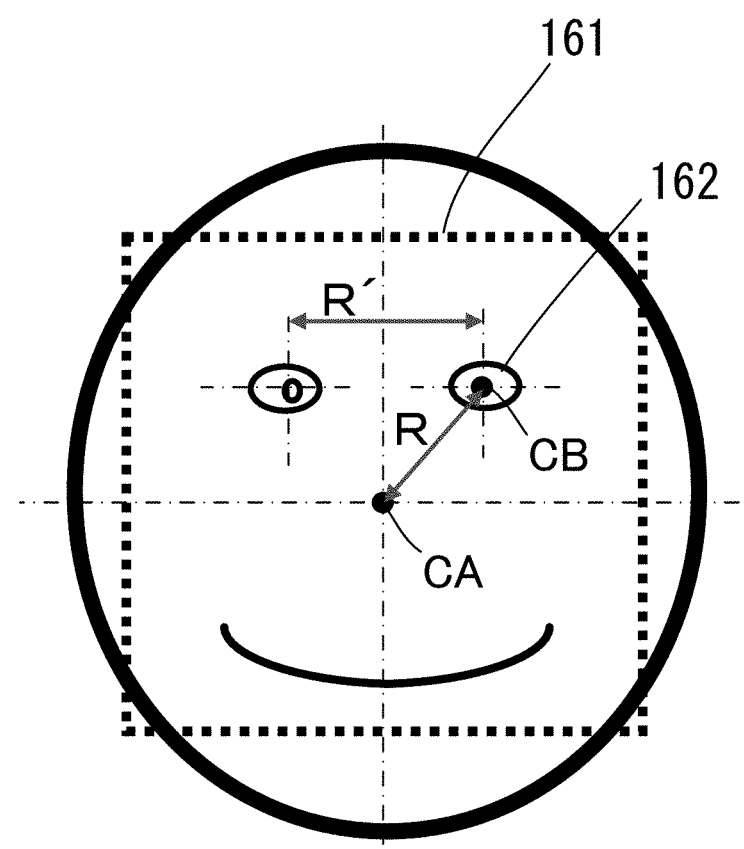

FIG. 15 is a schematic diagram illustrating calculation of a distance.

Figure 16:
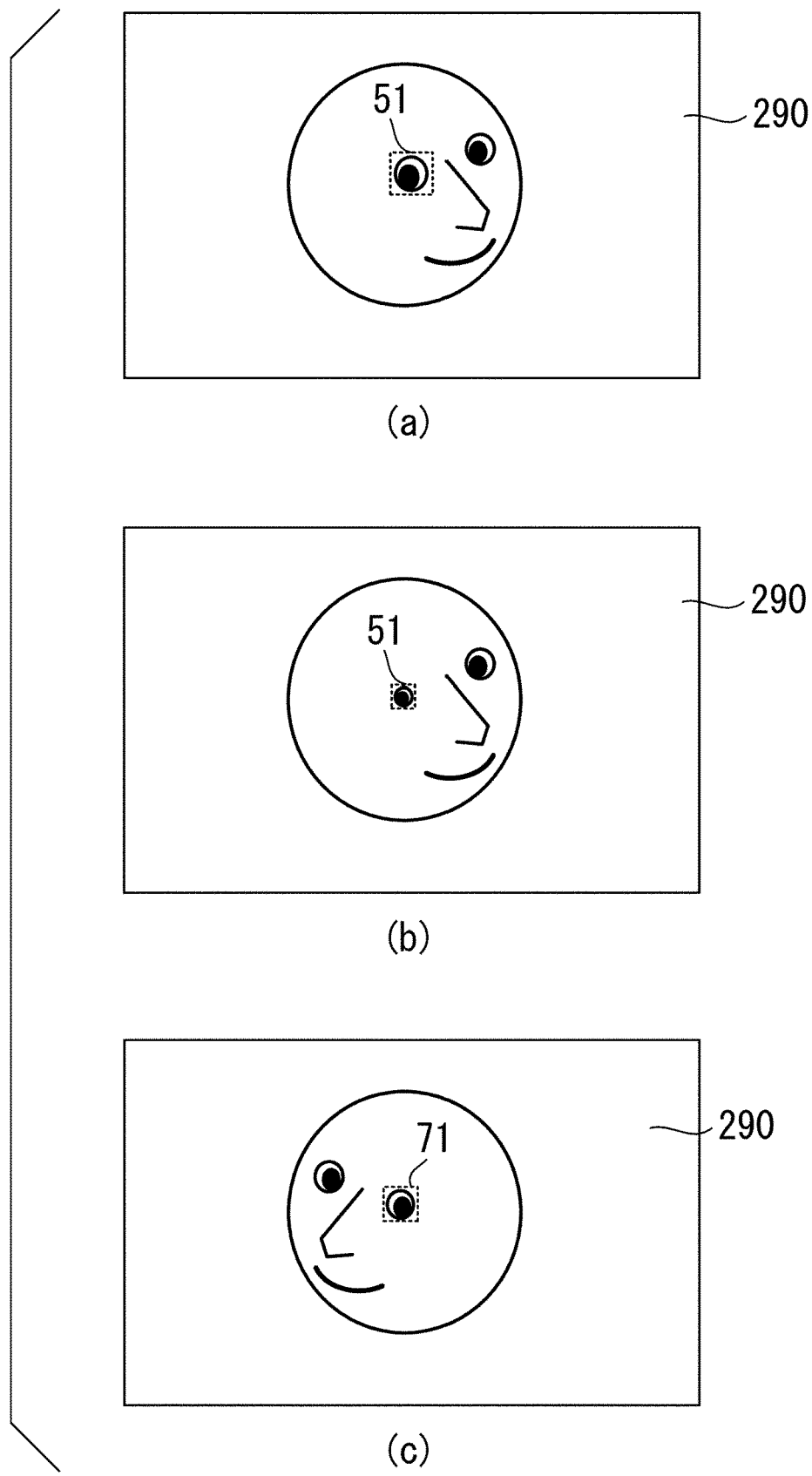

Parts (a) and (b) of FIG. 16 shows diagrams illustrating an example in which the face is turned to the right with respect to the camera system, and part (c) of FIG. 16 is a diagram illustrating an example in which the face is turned to the left with respect to the camera system.

DESCRIPTION OF EMBODIMENTS

Hereinafter, a mode for carrying out the present invention will be described with reference to the accompanying drawings.

First Embodiment

Figure 1:
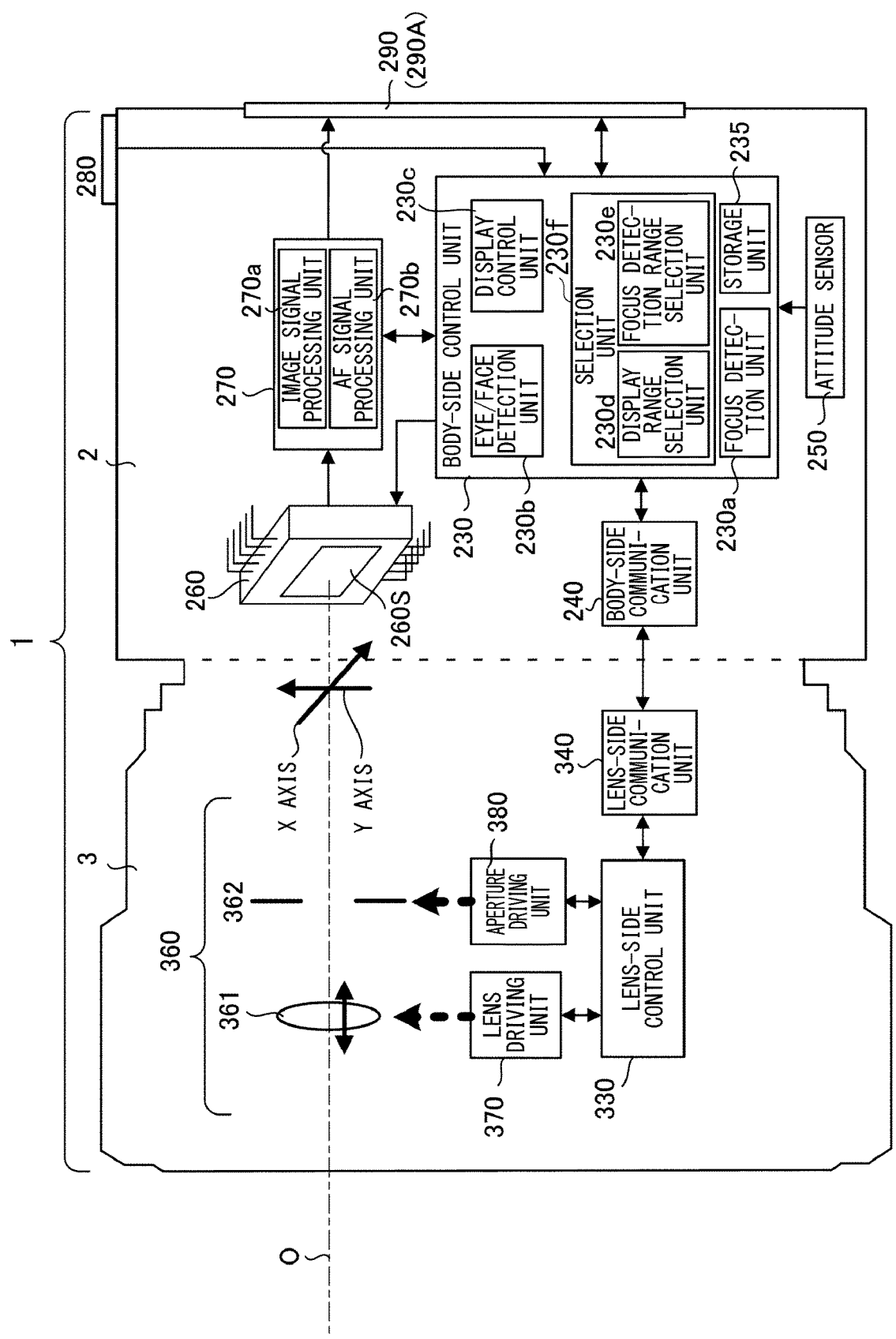
FIG. 1 is a schematic diagram illustrating main components of a camera system.

FIG. 1 is a schematic diagram illustrating main components of a camera system 1 according to a first embodiment of the invention. An example of the camera system 1 in which an imaging lens (referred to as an interchangeable lens 3) that can be attached to and detached from a camera body 2 is mounted is illustrated, but it may be a camera in which the camera body 2 and the imaging lens are integrally formed.

In FIG. 1, the in-plane horizontal direction intersecting an optical axis O of the interchangeable lens 3 is defined as an X axis, and the vertical direction is defined as a Y axis.
<Camera Body>

The camera body 2 includes a body-side control unit 230, a body-side communication unit 240, an attitude sensor 250, an imaging element 260, a signal processing unit 270, an operation member 280, and a display unit 290. The body-side control unit 230 is connected to the body-side communication unit 240, the attitude sensor 250, the imaging element 260, the signal processing unit 270, the operation member 280, and the display unit 290.

The body-side control unit 230 is constituted by a microcomputer, its peripheral circuits, and the like. The body-side control unit 230 includes a storage unit 235 that stores a control program or the like which is executed by the body-side control unit 230, a focus detection unit 230a that detects a focus, an eye/face detection unit 230b that detects an eye or a face, a display control unit 230c, and a selection unit 230f including a display range selection unit 230d that selects a display range and a focus detection range selection unit 230e that selects a focus detection range. The body-side control unit 230 executes the control program stored in the storage unit 235 to control each unit in the camera body 2. In the storage unit 235, recording and readout of data are controlled by the body-side control unit 230.

The body-side communication unit 240 performs predetermined communication with a lens-side communication unit 340 of the interchangeable lens 3. The body-side communication unit 240 is connected to the body-side control unit 230. The attitude sensor 250 detects angle information indicating whether the camera system 1 is held in a horizontal position or held in a vertical position, and sends out a detection signal to the body-side control unit 230. The camera system 1 is held in a horizontal position (a position of the camera in which the long side of an imaging surface 260S of the imaging element 260 is in a horizontal direction) in a case where an image of a horizontally long screen in an X-axis direction of FIG. 1 is captured and is held in a vertical position (a position of the camera in which the long side of the imaging surface 260S of the imaging element 260 is in a vertical direction) in a case where an image of a vertically long screen in a Y-axis direction is captured.

Light from a subject transmitted through the interchangeable lens 3 is guided to the imaging surface 260S of the imaging element 260. The imaging element 260 is a solid-state imaging element such as, for example, a CMOS image sensor or a CCD image sensor. The imaging element 260 captures a subject image formed on the imaging surface 260S in response to a control signal from the body-side control unit 230 and outputs a signal. The imaging element 260 enables moving image capturing and still image capturing. In addition to recording a moving image, the moving image capturing is also assumed to include capturing a so-called through image (also referred to as a live-view image) for continuously displaying an image for a monitor on the display unit 290.

The imaging element 260 includes a photoelectric conversion unit for image generation and a photoelectric conversion unit for focus detection. A pixel signal for image capturing based on electric charge generated by the photoelectric conversion unit for image generation is used to generate image data by an image signal processing unit 270a of the signal processing unit 270. In addition, a pixel signal for focus detection based on electric charge generated by the photoelectric conversion unit for focus detection is used in a focus detection process of detecting the focusing state of a subject image formed by the interchangeable lens 3, in other words, a shift between the position of the subject image formed by the interchangeable lens 3 and the position of the imaging surface 260S, by an AF signal processing unit 270b of the signal processing unit 270.

The imaging element 260 is connected to the signal processing unit 270 and the body-side control unit 230.

The signal processing unit 270 includes the image signal processing unit 270a and the AF signal processing unit 270b. The image signal processing unit 270a generates image data by performing predetermined image processing on the pixel signal for image capturing which is output from the imaging element 260. The generated image data is recorded in a storage medium (such as a memory card) (not shown) in a predetermined file format or is used for displaying a live-view image before image capturing or displaying a confirmation image after image capturing.

In addition, the AF signal processing unit 270b calculates the amount of defocus (the amount of shift between the image forming position of the interchangeable lens 3 and the imaging surface 260S) by performing a focus detection process of a phase difference detection method using the pixel signal for focus detection which is output from the imaging element 260. A contrast method may be adopted for the focus detection process.

The signal processing unit 270 is connected to the body-side control unit 230, the imaging element 260, and the display unit 290.

The operation member 280 including a release button, an operation switch, and the like is provided on the exterior surface of the camera body 2. The operation member 280 sends out an operation signal according to a user's operation to the body-side control unit 230. The user operates the operation member 280 to perform an image capturing instruction, a setting instruction for image capturing conditions, or the like. In addition, the user can instruct the operation member 280 to switch to an "AF area mode" to be described later.

The display unit 290 is constituted by an organic EL display panel or a liquid crystal display panel. The display unit 290 displays an image based on the image data processed by the image signal processing unit 270*a*, an operation menu screen, or the like in response to the control signal from the body-side control unit 230. In addition, the display unit 290 may be provided with a touch panel to configure a touch operation member 290A as a part of the operation member 280. The display unit 290 is connected to the body-side control unit 230.

<Interchangeable Lens>

The interchangeable lens 3 includes a lens-side control unit 330, the lens-side communication unit 340, an optical imaging system 360, a lens driving unit 370, and an aperture driving unit 380. The lens-side control unit 330 is connected to the lens-side communication unit 340, the lens driving unit 370, and the aperture driving unit 380.

The lens-side control unit 330 is constituted by a microcomputer, its peripheral circuits, and the like. The lens-side control unit 330 executes a control program stored therein and controls each unit of the interchangeable lens 3 such as automatic focus adjustment control.

The lens-side communication unit 340 performs predetermined communication with the body-side communication unit 240. Through the communication performed between the lens-side communication unit 340 and the body-side communication unit 240, an instruction or the like for moving the optical imaging system 360 or the like to be described later is transmitted from the camera body 2 to the interchangeable lens 3. In addition, through the communication performed between the lens-side communication unit 340 and the body-side communication unit 240, information such as the driving state of the optical imaging system 360 is transmitted from the interchangeable lens 3 to the camera body 2.

The optical imaging system 360 includes a plurality of lenses and an aperture member 362, and guides subject light to the imaging surface 260S of the imaging element 260 of the camera body 2. A focus lens 361 is included in the plurality of lenses.

For example, the focus lens 361 is configured to be capable of being moved in the direction of the optical axis O by the lens driving unit 370. The position of the subject image formed by the optical imaging system 360 is changed by the focus lens 361 being moved. Thereby, an AF operation (focusing) is performed.

The aperture 362 adjusts the amount of light incident on the imaging element 260. The aperture 362 is configured such that an aperture blade is driven and an opening diameter (aperture value) can be changed by the aperture driving unit 380 or through a manual operation.

Driving instructions such as the movement direction, movement amount, or movement speed of the focus lens 361 are given from the body-side control unit 230. Alternatively, the instructions may be given from the lens-side control unit 330 on the basis of information from the body-side control unit 230.

Through communication with the interchangeable lens 3, the camera body 2 sends, for example, a focus lens driving signal which is a driving instruction for a focus lens, an aperture driving signal, information of the camera body 2 (such as imaging mode information or ISO sensitivity information), or the like to the interchangeable lens 3. The lens driving unit 370 of the interchangeable lens 3 drives the focus lens 361 in accordance with a driving signal from the camera body 2.

On the other hand, the interchangeable lens 3 communicates with the camera body 2 to transmit, for example, information on the optical characteristics of the optical imaging system 360, information on the position of the focus lens 361, information on the opening diameter of the aperture 362, or the like to the camera body 2.

<Example of Camera Operation>

First, an example of a camera operation performed by the camera system 1 will be described.

Figure 2:
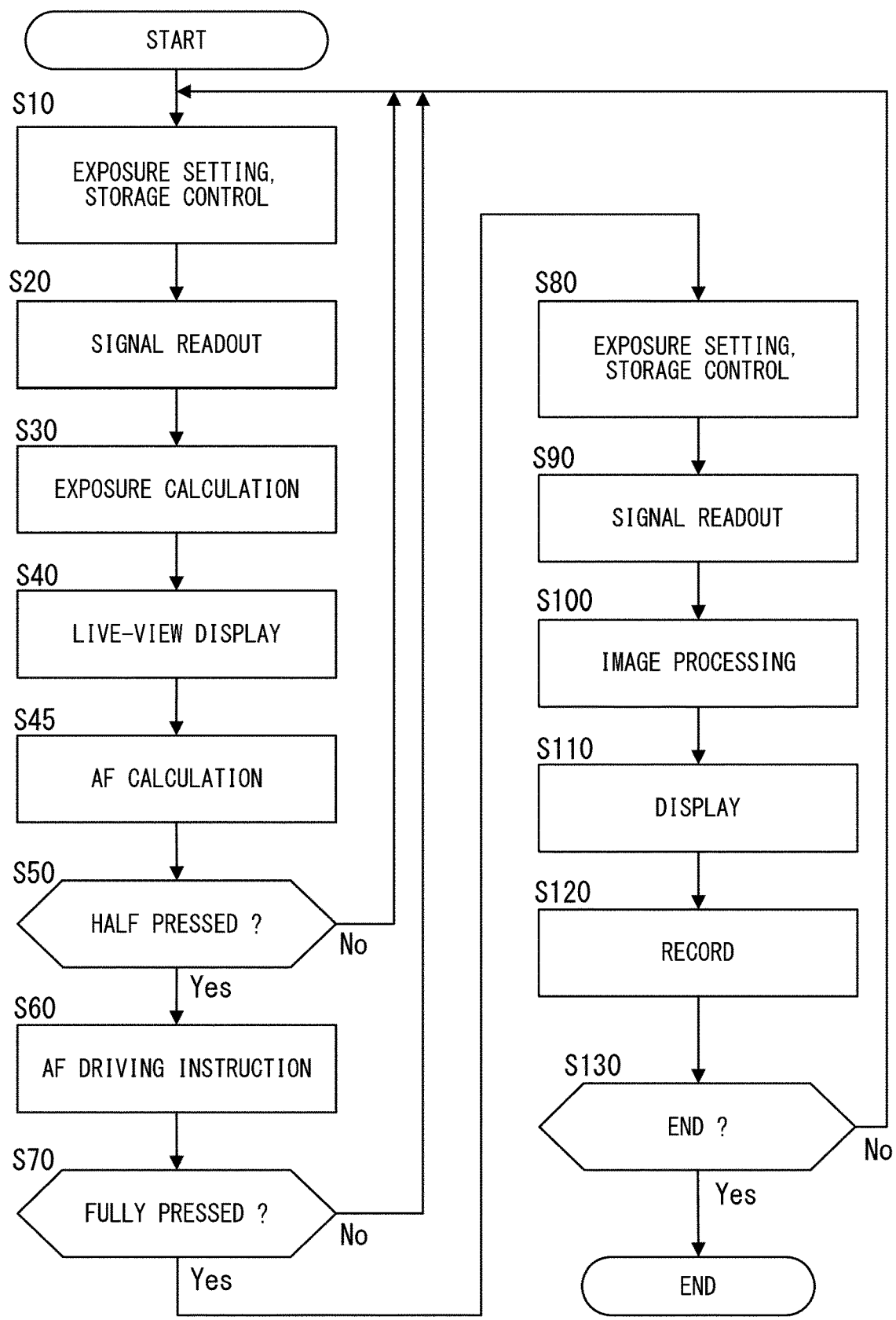
FIG. 2 is a flowchart illustrating a flow of processes which are executed by a body-side control unit.

FIG. 2 is a flowchart illustrating a flow of processes which are executed by the body-side control unit 230. The body-side control unit 230 starts, for example, processing according to the flowchart of FIG. 2 at the time of startup associated with an on operation of a main switch, or at the time of release of a sleep operation by operating a switch or the like constituting the operation member 280. The sleep operation is an operation of transitioning to a power-saving state in a case where a non-operation state continues for a predetermined time. The release of the sleep operation (return to a normal state) can be performed by, for example, half-pressing the release button.

In step S10, the body-side control unit 230 performs an exposure setting for a live-view image, and performs accumulation control (exposure control) on the imaging element 260. The exposure setting for the first image capturing after startup is controlled to an initial value determined in advance, and accumulation control is performed on the imaging element 260.

In step S20, the body-side control unit 230 reads out a signal from the imaging element 260 to the signal processing unit 270 and proceeds to step S30. The body-side control unit 230 calculates each control value by performing exposure calculation in step S30. That is, the body-side control unit 230 detects brightness information (a By value) of a subject on the basis of the pixel signal for image capturing which is input to the signal processing unit 270, and determines an aperture value (an Av value), shutter speed (a Tv value), and sensitivity (an Sv value) on the basis of the By value and information on a program diagram stored in the storage unit 235. Each calculated control value is stored in the storage unit 235.

In step S40, the body-side control unit 230 sets the aperture 362 to the determined aperture value and performs live-view display. The body-side control unit 230 causes the image signal processing unit 270*a* to generate a live-view image using the pixel signal for image capturing which is output from the imaging element 260 and causes the display unit 290 to display the generated live-view image.

In step S45, the body-side control unit 230 causes the AF signal processing unit 270*b* to perform AF calculation. Thereby, the AF signal processing unit 270*b* calculates the amount of defocus using the pixel signal for focus detection which is output from the imaging element 260.

In step S50, the body-side control unit 230 determines whether the release button has been half pressed. The body-side control unit 230 makes an affirmative determination in step S50 in a case where the release button is half pressed, followed by proceeding to step S60, and returns to step S10 in a case where the release button is not half pressed.

In step S60, the body-side control unit 230 performs an AF driving instruction. The body-side control unit 230 moves the focus lens 361 of the interchangeable lens 3 in the direction of the optical axis O on the basis of the amount of defocus calculated in step S45. That is, the lens-side control unit 330 instructs the lens driving unit 370 to drive the focus lens 361 and perform a focusing driving operation. Thereafter, the body-side control unit 230 proceeds to step S70.

In step S70, the body-side control unit 230 determines whether the release button has been fully pressed. The body-side control unit 230 makes an affirmative determination in step S70 in a case where the release button is fully pressed, followed by proceeding to step S80, and makes a negative determination in step S70 in a case where the release button is not fully pressed, followed by returning to step S10.

The body-side control unit 230 that has returned to step S10 performs step S10 and the subsequent steps again. The exposure setting for the second and subsequent frames of the live-view image uses the aperture value stored in the storage unit 235 and the shutter speed (Tv value) and the sensitivity (Sv value) stored in the storage unit 235.

In step S80 that proceeds in a case where the release button is fully pressed (affirmative determination in step S70), the body-side control unit 230 performs a storage operation for capturing an image for recording. In this case, the aperture 362 is set to the aperture value (Av value) stored in the storage unit 235, the accumulation control of the imaging element 260 is performed at the shutter speed (Tv value) stored in the storage unit 235, and the processing is performed using the sensitivity (Sv value) stored in the storage unit 235.

In step S90, the body-side control unit 230 reads out a signal from the imaging element 260 to the signal processing unit 270 and proceeds to step S100. In step S100, the body-side control unit 230 causes the image signal processing unit 270a to perform predetermined image processing on the pixel signal for image capturing which is output from the imaging element 260 and generate an image for recording. Thereby, the image signal processing unit 270a performs predetermined image processing to generate an image for recording.

In step S110, the body-side control unit 230 performs image display. That is, the body-side control unit 230 causes the display unit 290 to display the image processed by the image signal processing unit 270a in step S100 as a confirmation image.

In step S120, the body-side control unit 230 causes the storage unit 235 to record a file of the image processed by the image signal processing unit 270a.

In step S130, the body-side control unit 230 determines whether to end the processing. The body-side control unit 230 makes an affirmative determination in step S130, for example, in a case where the main switch is turned off or in a transition to a sleep operation and ends the processing according to FIG. 2. The body-side control unit 230 makes a negative determination in step S130 in a case where the camera operation is continued without ending the processing according to FIG. 2 and returns to step S10.

The order of the display process (S110) and the recording process (S120) may be changed, or they may be performed in parallel.

In addition, in the example of FIG. 2, the amount of defocus is calculated in the AF calculation (S45) after the live-view display (S40) is performed, but the amount of defocus may be calculated in parallel with the exposure calculation (S30), and the driving instruction for the focus lens 361 may be performed in step S60 after the half-press operation is performed in step S50.

Further, whenever each frame of the live-view image is acquired, the calculation of the amount of defocus and the driving instruction for the focus lens 361 may be performed in parallel with the exposure calculation (S30).

<Focus Point>

A focus point used for the focus detection process in the AF operation (S60) will be described below.

Figure 3:
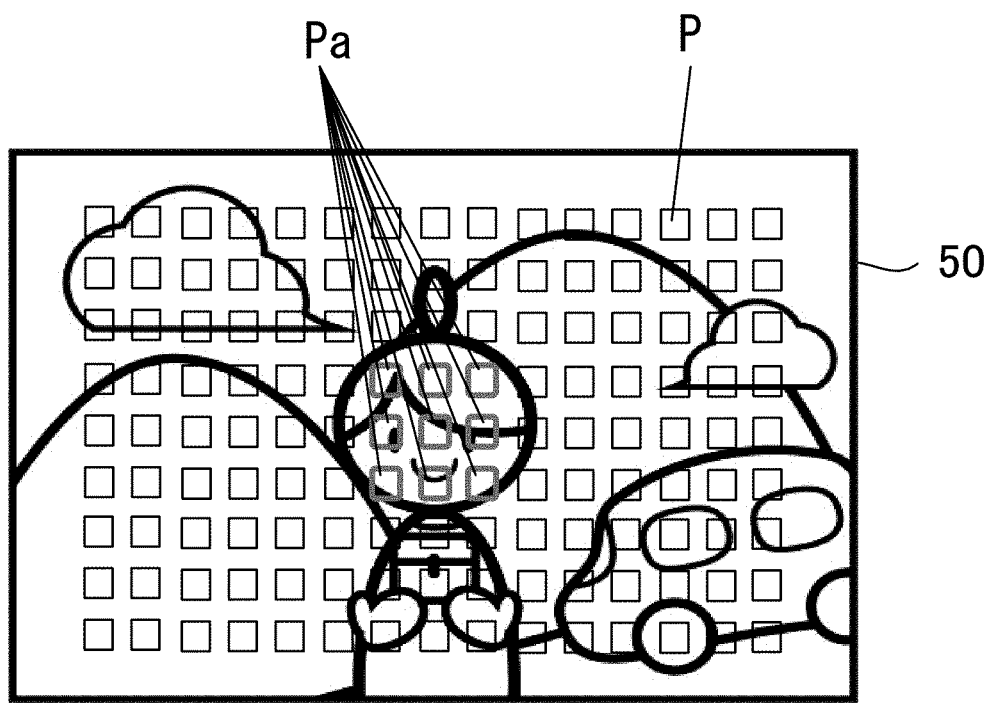
FIG. 3 is a diagram illustrating an imaging range.

FIG. 3 is a diagram illustrating an imaging range 50 captured by the imaging element 260 of the camera body 2. A plurality of (for example, 135) focus points P are provided in advance in the imaging range 50, and the focus points P are shown together with a captured image in FIG. 3.

The focus points P indicate positions at which focusing can be performed in the imaging range 50 and are also referred to as a focus detection area, focus detection positions, or distance measurement points.

The number of focus points P and the positions in the imaging range 50 which are shown in the drawing are merely an example and are not limited to the aspect of FIG. 3.

The focus detection unit 230a uses a signal from the AF signal processing unit 270b to calculate the amount of defocus (the amount of focus shift) which is the amount of shift between the position of a subject image formed by a flux of light that has passed through the interchangeable lens 3 and the position of the imaging surface 260S of the imaging element 260 of the camera body 2. The amount of image shift (phase difference) of subject images due to a pair of fluxes of light passing through different regions of the interchangeable lens 3 can be detected for each focus point P, and the amount of defocus can be calculated for each focus point P. The body-side control unit 230 calculates the amount of driving of the focus lens 361 on the basis of the amount of defocus calculated in focus points P selected from the plurality of focus points P and transmits a lens driving signal of the focus lens 361 to the interchangeable lens 3. By moving the focus lens 361 in accordance with the driving signal, the interchangeable lens 3 can align the position of a subject image in a region corresponding to focus points P selected from the plurality of focus points P with the position of the imaging surface 260S of the imaging element 260.

The body-side control unit 230 can automatically select focus points P used for calculating the amount of defocus from all the focus points P (in other words, used for focusing) and can also select focus points P specified by a user's operation. The general term for a method of selecting focus points P used for calculating the amount of defocus from all the focus points P is referred to as an "AF area mode."

The "AF area mode" includes, for example, "single point AF" for calculating the amount of defocus using only one focus point P selected by a user's operation, "wide area AF" for calculating the amount of defocus using a plurality of focus points P having a wider range than the single point AF, "auto area AF" in which a camera detects a subject from a range where all the focus points P are disposed and the amount of defocus is calculated using focus points P located in the range of the subject, and the like. The switching of the "AF area mode" can be selected by, for example, a user's operation from the operation menu screen.

The example of FIG. 3 shows a state in which the body-side control unit 230 switched to the "auto area AF" in the "AF area mode" detects a subject (person) close to the camera system 1 from the range where all the focus points P are disposed and selects nine focus points Pa located in the range of the person's head. The AF signal processing unit 270b in this case can calculate the amount of defocus for each of the nine focus points Pa.

In a case where the AF signal processing unit 270*b* calculates the amount of defocus for each of the plurality of focus points Pa, the body-side control unit 230 can select, for example, one focus point which is closest to the camera system 1 (close distance) or has a highest contrast of the pixel signal for focus detection among the plurality of focus points Pa. The body-side control unit 230 transmits the driving signal of the focus lens 361 to the interchangeable lens 3 so as to focus on a portion of the person corresponding to the selected focus point.

In a case where one focus point is selected, the body-side control unit 230 drives the focus lens 361 to display an indication (an AF frame) indicating one focused focus point Pa superimposed on the live-view image displayed on the display unit 290.

The body-side control unit 230 can also perform an AF operation so as to focus on the entire head (to be included in the depth of field) in consideration of the amount of defocus of each of the nine focus points Pa located on the head. For example, an average value of the nine amounts of defocus may be calculated to drive (perform an AF operation on) the focus lens 361 with the amount of defocus of the calculated average value, or the AF operation may be performed by calculating a weighted average so that the nine amounts of defocus fall within the depth of field insofar as possible.

In a case where nine focus points Pa are used, in the AF operation (S60), the body-side control unit 230 displays an indication (an AF frame) indicating each of the nine focused focus points Pa superimposed on the live-view image displayed on the display unit 290.

<Face Detection and Eye Detection>

The present embodiment has a function of detecting a face of a subject from image data and a function of detecting an eye of the detected face. Any one of a first setting for enabling a function of detecting both a face and an eye, a second setting for enabling a function of detecting a face and disabling a function of detecting an eye, and a third setting for disabling a function of detecting both a face and an eye can be selected in the case of being switched to the "auto area AF." The first setting, the second setting, or the third setting is selected by, for example, a user's operation from the operation menu screen. A setting for disabling a function of detecting a face and enabling a function of detecting an eye may be included.

In the present embodiment, an example in which an eye is detected will be described, but an iris or a pupil may be detected in the same way. In addition, an eye to be detected is not limited to a human eye and may be an eye of an animal such as a pet. Further, not only the eye but also the feature portion of the face or an object may be used.

The above description illustrated as the AF operation of the "auto area AF" is an AF operation in a case where the third setting is selected. Therefore, an AF operation in a case where the first setting is selected and an AF operation in a case where the second setting is selected will be described below.

<First Setting>

In the case of the first setting for enabling a function of detecting both a face and an eye, as illustrated in FIG. 4(*a*), the body-side control unit 230 displays an indication frame 41 (an AF frame) indicating a detected eye superimposed on the live-view image displayed on the display unit 290. In the present embodiment, as the indication frame 41 indicating a detected eye, a frame surrounding the contour of an eye including the white portion of the eye is illustrated, but a frame surrounding an iris or a pupil not including the white portion of the eye may be used.

In a case where the live-view image of the display unit 290 is enlarged and displayed, the body-side control unit 230 enlarges the live-view image centering on the position of the detected eye.

In a case where right and left eyes are detected, the body-side control unit 230 can select, for example, the larger of the right and left eyes on the basis of the size of the eyes. FIG. 4(*a*) is an example in which the indication frame 41 is displayed on the right eye determined to be large. The AF signal processing unit 270*b* can calculate the amount of defocus for each focus point P corresponding to the indication frame 41. The body-side control unit 230 can select, for example, one focus point which is closest to the camera system 1 (close distance) or has a highest contrast among a plurality of focus points P. The body-side control unit 230 performs an AF operation so as to focus on a portion of the indication frame 41 corresponding to the selected focus point P.

The body-side control unit 230 can also perform an AF operation so as to focus on the entire eye indicated by the indication frame 41 (to be included in the depth of field) in consideration of the amount of defocus of each of the plurality of focus points P corresponding to the indication frame 41.

In addition, in a case where the right and left eyes are detected, the body-side control unit 230 can also select, for example, one eye determined in advance.

<Second Setting>

In the case of the second setting for enabling a function of detecting a face and disabling a function of detecting an eye, as illustrated in FIG. 4(*b*), the body-side control unit 230 displays an indication frame 42 (an AF frame) indicating a detected face superimposed on the live-view image displayed on the display unit 290. In the present embodiment, as the indication frame 42 indicating a detected face, a frame surrounding at least a portion of the forehead including the eyebrows, at least a portion of both cheeks, and at least a portion under the lips is illustrated, but the size of the frame may be appropriately changed insofar as a background other than the face is not included in the frame. For example, in a case where the size of the frame is set to 0.8 times the length of the contour of the detected face in the X-axis direction (horizontal direction) and 0.8 times the length of the contour of the detected face in the Y-axis direction (vertical direction), the background other than the face is less likely to be included in the frame, which leads to a desirable result.

The AF signal processing unit 270*b* can calculate the amount of defocus for each focus point P corresponding to the indication frame 42. The body-side control unit 230 can select, for example, one focus point P which is closest to the camera system 1 (close distance) or has a highest contrast of the pixel signal for focus detection among a plurality of focus points P. The body-side control unit 230 performs an AF operation so as to focus on a portion of the indication frame 42 corresponding to the selected focus point P.

The body-side control unit 230 can also perform an AF operation so as to focus on the entire face indicated by the indication frame 42 (to be included in the depth of field) in consideration of the amount of defocus of each of the plurality of focus points corresponding to the indication frame 42.

In addition, in a case where a face is detected in the first setting but no eye is detected on the face, the body-side control unit 230 displays the indication frame 42 indicating a detected face superimposed on the live-view image displayed on the display unit 290 similarly to the case of the second setting (FIG. 4(b)). The AF signal processing unit 270b is assumed to calculate the amount of defocus on the basis of the focus points P corresponding to the indication frame 42 similarly to the case of the second setting.

In the first setting, a face is first detected, and then an eye of the detected face is detected. In a case where the indication frame 42 is displayed at a point in time when the face is detected, the indication frame 41 is displayed instead of the indication frame 42 being displayed at a point in time when the eye is detected, which may impair the usability for the user. Therefore, in the present embodiment, in a case where a face is detected for the first time, it is determined whether the indication frame 41 is displayed or the indication frame 42 is displayed depending on whether an eye can be detected in the detected face. With such a configuration, the indication frame 41 can be displayed when an eye is detected in the detected face (FIG. 4(a)), and the indication frame 42 can be displayed when an eye is not detected in the detected face (FIG. 4(b)).

<Case where a Plurality of Eyes or Faces are Detected>

FIG. 5 is a diagram illustrating a case where a plurality of eyes or faces are detected. In the first setting and the second setting, it is assumed that the user desires to focus on another eye or face other than the eye or face selected by the body-side control unit 230. Therefore, the body-side control unit 230 displays the indications 52 and 53 (triangle marks) for informing the user that an eye or face other than the eye or face corresponding to an indication frame 51 (an AF frame) displayed on the live-view image has been detected superimposed on the live-view image displayed on the display unit 290.

For example, in the case of the first setting, the body-side control unit 230 is assumed to detect three faces 55, 56, and 57 included in the live-view image illustrated in FIG. 5, select the face 55 located closest to the center of a screen, detect the right and left eyes of the face 55, select a left eye facing the face (hereinafter referred to as a left eye) determined to be large, and cause the display unit 290 to display the indication frame 51 indicating the left eye.

In a case where the left eye is selected, the body-side control unit 230 records information indicating that the body-side control unit 230 has selected the left eye in the storage unit 235. The reason for this is, for example, that the face cannot be detected once in the subsequent live-view image, and when the eye of the face detected in the subsequent live-view image is selected, the left eye is selected on the basis of information recorded in the storage unit 235 (in the present example, information indicating that the left eye has been selected). By selecting one of the right and left eyes using the information recorded in the storage unit 235, it is possible to avoid a situation in which the selected eye is switched each time the face is detected again.

The information indicating the eye selected by the body-side control unit 230 which is recorded in the storage unit 235 is held until the main switch is turned off or the "AF area mode" is switched.

The body-side control unit 230 further displays the indication 53 (such as an indication indicating a direction, for example, "<", hereinafter referred to as a triangle mark) indicating that an eye 54 on the right side facing the face (hereinafter referred to as a right eye) has been detected on the right side of the indication frame 51. Since the triangle mark 53 is displayed on the right side of the indication frame 51, it can be understood that the user can select the right eye 54.

The body-side control unit 230 further displays the indication 52 (a triangle mark) indicating that the face 56 located on the left side of the face 55 has been detected on the left side of the indication frame 51. Since the triangle mark 52 is displayed on the left side of the indication frame 51, it can be understood that the user can select the face 56 located on the left side.

A frame surrounding the right eye 54, a frame surrounding the face 55, a frame surrounding the face 56, and a frame surrounding the face 57 which are shown by dashed-dotted lines in FIG. 5 are attached for the purpose of description, and may not be displayed on the display unit 290.

Indication frames may be displayed on all of the eyes detected from the three faces 55, 56, and 57 included in the live-view image illustrated in FIG. 5, and the form of the indication frame of the eye selected by the body-side control unit 230 may be changed to the form of another indication frame. For example, the size of the indication frame of the selected eye may be changed, the color of the indication frame may be changed, or the shape of the indication frame may be changed.

The indication 52 is not limited to "<" and may be a triangle, an arrow, or the like.

<Selection of Eye Performed by User>

FIG. 6 is a diagram illustrating an exterior surface on the backside of the camera body 2 in a case where the camera system 1 is held in a horizontal position. Two switches constituting the operation member 280, that is, operation switches 281 and 282, are disposed in parallel with a straight line H indicating the X-axis direction (horizontal direction). The user can change the eye or face to be focused in a horizontal direction, for example, by operating the operation switches 281 and 282.

FIG. 7 is a diagram illustrating a case where the eye 54 located on the right side of the indication frame 51 of the face 55 in FIG. 5 is selected. When the operation switch 282 is operated by the user, the body-side control unit 230 selects the right eye of the face 55 and causes the display unit 290 to display an indication frame 71 (an AF frame) indicating the right eye. The AF signal processing unit 270b calculates the amount of defocus on the basis of focus points P corresponding to the indication frame 71.

The body-side control unit 230 further displays an indication 73 (a triangle mark) indicating that the face 57 located on the right side of the face 55 has been detected on the right side of the indication frame 71. Since the triangle mark 73 is displayed on the right side of the indication frame 71, it can be understood that the user can select the face 57 located on the right side.

The body-side control unit 230 further displays an indication 72 (a triangle mark) indicating that a left eye 74 of the face 55 has been detected on the left side of the indication frame 71. Since the triangle mark 72 is displayed on the left side of the indication frame 71, it can be understood that the user can select the left eye 74.

A frame surrounding the left eye 74, a frame surrounding the face 55, a frame surrounding the face 56, and a frame surrounding the face 57 which are shown by dashed-dotted lines in FIG. 7 are attached for the purpose of description, and may not be displayed on the display unit 290.

In a case where a right eye different from the left eye on which the indication frame 51 (FIG. 5) is displayed before an operation of the operation switch 282 is selected on the basis of the operation, the body-side control unit 230 records information indicating that the right eye has been selected on the basis of the user's operation in the storage unit 235. For example, this is because the face cannot be detected once in the subsequent live-view image, and when the eye of the face detected in the subsequent live-view image is selected, the right eye is selected on the basis of the information recorded in the storage unit 235 (in the present example, information indicating that the right eye has been selected). By selecting one of the right and left eyes using the information recorded in the storage unit 235, it is possible to avoid a situation in which the selected eye is switched each time the face is detected again.

The information indicating the eye on the side selected on the basis of a user's operation which is recorded in the storage unit 235 is held until the main switch is turned off or the "AF area mode" is switched.

FIG. 8 is a diagram illustrating a case where the eye of the face 57 located on the right side of the indication frame 71 of the face 55 in FIG. 7 is selected. When the operation switch 282 is operated by the user, the body-side control unit 230 selects the face 57 located on the right side of the face 55, detects the right and left eyes of the face 57, selects an eye on the left side facing the face 57 (hereinafter referred to as a left eye), and causes the display unit 290 to display an indication frame 81 (an AF frame) indicating the left eye. The AF signal processing unit 270b calculates the amount of defocus on the basis of focus points P corresponding to the indication frame 81.

The body-side control unit 230 further displays an indication 83 (a triangle mark) indicating that an eye 84 on the right side facing the face 57 (hereinafter referred to as a right eye) has been detected on the right side of the indication frame 81. Since the triangle mark 83 is displayed on the left side of the indication frame 81, it can be understood that the user can select the right eye 84.

The body-side control unit 230 further displays an indication 82 (a triangle mark) indicating that the face 55 located on the left side of the face 57 has been detected on the left side of the indication frame 81. Since the triangle mark 82 is displayed on the left side of the indication frame 81, it can be understood that the user can select the face 55 located on the left side.

A frame surrounding the right eye 84, a frame surrounding the face 55, a frame surrounding the face 56, and a frame surrounding the face 57 which are shown by dashed-dotted lines in FIG. 8 are attached for the purpose of description, and may not be displayed on the display unit 290.

As described above, in a case where the eye of the face 57 different from the face 55 on which the indication frame 71 is displayed before an operation of the operation switch 282 is selected on the basis of the operation, a left eye close to the face 55 is selected, and the indication frame 81 indicating this left eye is displayed.

FIG. 9 is a diagram illustrating another example in a case where the eye of the face 57 located on the right side of the indication frame 71 of the face 55 in FIG. 7 is selected. When the display position of the face 57 of the display unit 290 is touched by the user through the touch operation member 290A, the body-side control unit 230 selects the face 57 located on the right side of the face 55, detects the right and left eyes of the face 57, selects an eye on the right side facing the face 57 (hereinafter referred to as a right eye), and causes the display unit 290 to display an indication frame 84A indicating the right eye.

In a case where the eye of the face 57 different from the face 55 on which the indication frame 71 is displayed before the touch operation is selected on the basis of the operation, the body-side control unit 230 selects the right eye on the basis of the information recorded in the storage unit 235 (in the present example, information indicating that the right eye has been selected), and displays the indication frame 84A indicating the selected right eye.

The AF signal processing unit 270b calculates the amount of defocus on the basis of focus points P corresponding to the indication frame 84A.

In a case where the position of the touch operation is the position of the left eye of the face 57, the body-side control unit 230 selects the left eye regardless of the information recorded in the storage unit 235, and displays an indication frame indicating the selected left eye. The AF signal processing unit 270b calculates the amount of defocus on the basis of focus points P corresponding to the indication frame indicating the left eye.

In this way, the body-side control unit 230 selects the eye in a case where the position of the touch operation is the position of the eye and selects either the left or right eye on the basis of the information recorded in the storage unit 235 in a case where the position of the touch operation is not the position of the eye.

The body-side control unit 230 further displays an indication 85 (a triangle mark) indicating that a left eye 81A of the face 57 has been detected on the left side of the indication frame 84A. Since the triangle mark 85 is displayed on the left side of the indication frame 84A, it can be understood that the user can select the left eye 81A.

A frame surrounding the left eye 81A, a frame surrounding the face 55, a frame surrounding the face 56, and a frame surrounding the face 57 which are shown by dashed-dotted lines in FIG. 9 are attached for the purpose of description, and may not be displayed on the display unit 290.

The indication of the triangle mark described with reference to FIGS. 5 to 9 may have different indication aspects such as, for example, color, shape, characters, or icon addition in a case where an eye in a direction indicated by the triangle mark can be selected and a case where a face can be detected in a direction indicated by the triangle mark but an eye cannot be detected and only a face can be selected.

In addition, the display of the indication frame (AF frame) described with reference to FIGS. 5 to 9 may have different indication aspects such as, for example, color, shape, characters, or icon addition in a case where the indication frame is displayed on an eye selected by the body-side control unit 230 and a case where the indication frame is displayed on an eye selected by the user's operation.

<Relationship Between Size of Eye or Face and Indication Frame>

Parts (a) to (c) of FIG. 10 show diagrams illustrating a relationship between the size of the eye or face in the image and the indication frame. In the first setting, in a case where the size of the eye in the live-view image is too small, information of the eye included in focus points P corresponding to the indication frame is reduced, so that the accuracy of calculation of the amount of defocus decreases. Therefore, calculating the amount of defocus using the information of not only the eye but also the face is effective in preventing a decrease in the accuracy of calculation of the amount of defocus.

Part (a) of FIG. 10 shows a diagram illustrating a case where the size of the eye is sufficiently large in the live-view image. In a case where the size of the eye is sufficiently large, the accuracy of calculation of the amount of defocus is secured using the information of the eye alone. Therefore, the body-side control unit 230 in which the first setting is selected detects the right and left eyes of the face 55, and causes the display unit 290 to display, for example, the eye-sized indication frame 51 indicating the left eye. The AF signal processing unit 270b calculates the amount of defocus on the basis of focus points P corresponding to the indication frame 51.

FIG. 10(*b*) shows a diagram illustrating a case where the size of the eye is small in the live-view image. The body-side control unit 230 in which the first setting is selected causes the display unit 290 to display the indication frame 51 indicating the left eye of the face 55, for example, in a case where the number of pixels A of the eye in the X-axis direction (horizontal direction) is smaller than Q1 percent of the number of pixels Th of the live-view image in the horizontal direction and larger than Q2 percent (Q2<Q1). In this case, the indication frame 51 having a small size is displayed in accordance with the eye of FIG. 10(*b*) having a smaller size than the eye of FIG. 10(*a*).

The AF signal processing unit 270*b* is assumed to calculate the amount of defocus on the basis of focus points P corresponding to a frame indicating the face 55 (which has the same size as the face-sized indication frame) regardless of the size of the indication frame 51 indicating the left eye of the face 55. With such a configuration, not only the left eye of the face 55 but also information of the face 55 shown by a dashed-dotted line is used to prevent a decrease in the accuracy of calculation of the amount of defocus.

The reason for calculating the amount of defocus using the information of the face 55 will be further described. In a case where the size of the eye is small in the live-view image, the information of the eye included in the focus points P (FIG. 3) is reduced. In addition, a case where focus points P are not disposed at a position corresponding to the detected eye and the information of the eye is not included in the focus points P can also be assumed. For this reason, it becomes difficult to calculate the amount of defocus on the basis of the focus points P corresponding to the indication frame 51 indicating the eye.

On the other hand, it can be considered that the reason why the size of the detected eye is reduced is because the distance from the camera system 1 to the eye (face) is long. It may be considered that such a distant subject has no substantial difference between the focus position on the face and the focus position of the eye unlike a subject close to the camera system 1. That is, the focus position of the nose or lips and the focus position of the eye may be regarded as being the same as each other. Therefore, in the present embodiment, the amount of defocus is calculated by selecting focus points P having a high contrast of the pixel signal for focus detection from the plurality of focus points P corresponding to the frame indicating the face 55 having a larger size than the indication frame 51. With such a calculation, the amount of defocus can be appropriately calculated on the basis of a large number of focus points P corresponding to the frame indicating the face 55.

The frame surrounding the face 55 is shown for the purpose of description, and may not be displayed on the display unit 290.

FIG. 10(*c*) shows a diagram illustrating a case where the size of the eye becomes smaller in the live-view image. The body-side control unit 230 in which the first setting is selected causes the display unit 290 to display a face-sized indication frame 59 indicating the face 55 instead of the indication frame 51 indicating the left eye of the face 55 in a case where the size of the eye in the live-view image is smaller than that in FIG. 10(*b*), for example, a case where the number of pixels A of the eye in the X-axis direction (horizontal direction) is smaller than Q2 percent (Q2<Q1) of the number of pixels Th of the live-view image in the horizontal direction.

The AF signal processing unit 270*b* is assumed to calculate the amount of defocus on the basis of focus points P corresponding to the indication frame 59 indicating the face 55. With such a configuration, the information of the face 55 is used to prevent a decrease in the accuracy of calculation of the amount of defocus. In addition, by causing the display unit 290 to display the indication frame 59 having a larger size than the indication frame 51 indicating the eye, it is possible to show the user a target for focusing in an easy-to-understand manner.

In addition, in parts (a) to (c) of FIG. 10, the indication frame 51 indicating the eye may be displayed in a case where the number of pixels A of the eye in the X-axis direction (horizontal direction) is larger than a predetermined value regardless of the number of pixels of the live-view image, and the indication frame 59 indicating the face 55 may be displayed on the display unit 290 in a case where the number of pixels A of the eye in the X-axis direction (horizontal direction) is smaller than a threshold.

Similarly, in parts (a) to (c) of FIG. 10, the amount of defocus may be calculated on the basis of the focus points P corresponding to the frame indicating the face 55 (which has the same size as the face-sized indication frame) in a case where the number of pixels A of the eye in the X-axis direction (horizontal direction) is larger than a predetermined value regardless of the number of pixels of the live-view image, and the amount of defocus may be calculated on the basis of focus points P corresponding to a frame indicating the eye (which has the same size as the eye-sized indication frame) in a case where the number of pixels A of the eye in the X-axis direction (horizontal direction) is smaller than the predetermined value.

That is, it may be determined by a threshold that does not depend on the number of pixels Th in the live-view image in the horizontal direction.

<Example of Frame Display Operation>

FIG. 11 is a flowchart illustrating a flow of processes of determining an indication frame (an AF frame) which are executed by the body-side control unit 230 in a case where the first setting is selected. The body-side control unit 230 determines focus points P used for calculating the amount of defocus described above by executing the processing according to the flowchart of FIG. 11.

In step S310, the body-side control unit 230 determines whether a face has been detected on the basis of the live-view image. The body-side control unit 230 makes an affirmative determination in step S310 in a case where a face is detected, followed by proceeding to step S320 and makes a negative determination in step S310 in a case where a face is not detected, followed by proceeding to step S360.

In step S320, the body-side control unit 230 determines whether an eye has been detected in the face detected in S310 on the basis of the live-view image. The body-side control unit 230 makes an affirmative determination in step S320 in a case where an eye is detected, followed by proceeding to step S330, and makes a negative determination in step S320 in a case where an eye is not detected, followed by proceeding to step S350.

In step S330, the body-side control unit 230 determines whether the size of the eye is larger than a first threshold determined in advance. The body-side control unit 230 makes an affirmative determination in step S330, for example, in a case where the number of pixels A of the eye in the X-axis direction (horizontal direction) is larger than Q2 percent of the number of pixels Th of the live-view image in the horizontal direction, and proceeds to step S340. The body-side control unit 230 makes a negative determination in step S330 in a case where the number of pixels A is equal to or less than Q2 percent of the number of pixels Th, and proceeds to step S350.

In step S340, the body-side control unit 230 causes the display unit 290 to display the eye-sized indication frame 51 on the basis of information of the detected eye. Specifically, as illustrated in parts (a) and (b) of FIG. 10, the indication frame 51 indicating the eye is displayed at the position of the detected eye, and the process proceeds to step S370.

In step S370, the body-side control unit 230 determines whether the size of the eye is larger than a second threshold determined in advance. The body-side control unit 230 makes an affirmative determination in step S370, for example, in a case where the number of pixels A of the eye in the X-axis direction (horizontal direction) is larger than Q1 (Q2<Q1) percent of the number of pixels Th of the live-view image in the horizontal direction and proceeds to step S380. The body-side control unit 230 makes a negative determination in step S370 in a case where the number of pixels A is equal to or less than Q1 percent of the number of pixels Th, and proceeds to step S390.

In a case where the size of the eye is small, there is a high possibility of the eye having been erroneously detected. In the present embodiment, the reliability of the detected eye is evaluated by comparing the size of the eye with the second threshold.

In step S380, the body-side control unit 230 causes the AF signal processing unit 270b to perform an AF calculation on the basis of the eye-sized indication frame 51 and ends the processing according to FIG. 11. The AF signal processing unit 270b calculates the amount of defocus on the basis of the focus points P corresponding to the indication frame 51 (FIG. 10(a)).

In step S350 to which the process proceeds after a negative determination in step S320 or step S330, the body-side control unit 230 causes the display unit 290 to display the face-sized indication frame 59 on the basis of the information of the detected face. Specifically, as illustrated in FIG. 10(c), the indication frame 59 indicating the face 55 is displayed at the position of the detected face, and the process proceeds to step S390.

In step S390, the body-side control unit 230 causes the AF signal processing unit 270b to perform an AF calculation on the basis of the face-sized indication frame 59 and ends the processing according to FIG. 11. In a case where the process proceeds to S390 after S350, the AF signal processing unit 270b calculates the amount of defocus on the basis of the focus points P corresponding to the indication frame 59 (FIG. 10(c)). In addition, in a case where a negative determination is made in S370 and the process proceeds to S390, the AF signal processing unit 270b calculates the amount of defocus on the basis of focus points P corresponding to the frame indicating the face 55 (face-sized indication frame) regardless of the size of the indication frame 51 displayed in FIG. 10(b).

In a case where a negative determination is made in step S310, face detection and eye detection are not performed. In step S360, the body-side control unit 230 does not display the indication frame at the face position or the eye position and displays the same indication frame as in a case where the third setting is selected. That is, a subject close to the camera system 1 is detected from a range in which all the focus points P are disposed, and an indication (an AF frame) indicating a plurality of focus points P located in the range of the subject is displayed on the display unit 290.

In step S400, the body-side control unit 230 causes the AF signal processing unit 270b to perform a predetermined AF calculation and ends the processing according to FIG. 11. Similarly to the case where the third setting is selected, the AF signal processing unit 270b calculates the amount of defocus for each of the plurality of focus points P located in the range of the subject.

There may be a difference between a case where the first threshold used for the determination in step S330 is changed in a direction in which the size of the eye is large and a case where it is changed in a direction in which the size of the eye is small. By providing the difference, it is possible to prevent a decrease in the usability for the user due to frequent switching of the display size of an indication frame (an AF frame) in the vicinity of the first threshold.

In addition, in the flowchart of FIG. 11, step S330 may be omitted. That is, in a case where an eye is detected in step S320, the eye-sized indication frame 51 may be displayed on the display unit 290 on the basis of information of the detected eye regardless of the size of the eye.

<Selection of Eye Performed by User in Vertical Position>

FIG. 12 is a diagram illustrating an exterior surface on the backside of the camera body 2 in a case where the camera system 1 is held in a vertical position. Two switches constituting the operation member 280, that is, operation switches 283 and 284, are disposed in substantially parallel with the straight line H indicating the X-axis direction (horizontal direction). The user can change the eye or face to be focused in the horizontal direction, for example, by operating the operation switches 283 and 284.

When the camera system 1 is held in the vertical position, the two operation switches 281 and 282 disposed in parallel with the straight line H in a state where the camera system 1 is held in the horizontal position (FIG. 6) are unsuitable for an operation of changing a target for focusing in the horizontal direction. The body-side control unit 230 uses the two operation switches 283 and 284 instead of the operation switches 281 and 282 to perform an operation of changing a target for focusing in the horizontal direction, in other words, selecting the right and left eyes.

In FIG. 12, a straight line H' indicates the longitudinal direction of the exterior surface of the camera body 2. The body-side control unit 230 switches between two switches used for an operation of selecting the right and left eyes on the basis of a detection signal of the attitude sensor 250. In a case where an angle θ between the straight line H indicating the X-axis direction (horizontal direction) and the straight line H' exceeds, for example, 75 degrees when the camera system 1 held in the horizontal position is changed to the vertical position, the body-side control unit 230 uses the two operation switches 283 and 284 to perform an operation of selecting the right and left eyes.

On the contrary, in a case where the angle θ becomes smaller than 65 degrees when the camera system 1 held in the vertical position is changed to the horizontal position, the body-side control unit 230 uses the two operation switches 281 and 282 to perform an operation of selecting the right and left eyes.

In this way, in a case where the camera system 1 held in the horizontal position is changed to the vertical position and a case where the camera system 1 held in the vertical position is changed to the horizontal position, a difference is provided in the threshold of the angle θ for determining the switching of the two switches used for an operation of selecting the right and left eyes, so that it is possible to prevent a decrease in the usability for the user due to frequent switching of the two switches in the vicinity of the threshold.

In addition, indications of operation members (such as icons) equivalent to the operation switches 281 to 284 in FIGS. 12 and 6 may be displayed on the display unit 290, and the user may select the right and left eyes by touching the operation icons. For example, in a case where the camera system 1 is configured with a housing such as a smartphone, the user can select the right and left eyes simply by moving his or her finger in a predetermined range, and thus usability can be improved.

Further, in FIG. 12 or 6, in a case where the camera body 2 has an electronic viewfinder (EVF), contents displayed on the display unit 290 (such as the live-view image or the indication frame) may be displayed on the EVF. In this case, the user selects the right and left eyes by operating the operation switches 281 to 284 while observing the EVF. Since the right and left eyes can be selected by operating the operation switches 281 to 284 without taking the eyes off the EVF, the usability for the user can be improved.

<Select Right and Left Eyes with Face Position as Reference>

FIGS. 7 to 9 referred to in the above description in which the right and left eyes are selected on the basis of the user's operation of the operation switch 282 are an example in which a plurality of faces are lined up in the X-axis direction (horizontal direction). Therefore, when the operation switch 282 is operated in a state where the indication frame 71 is displayed on the right eye of the face 55 in FIG. 7, there is no problem in that the indication frame 81 is displayed on the left eye of the face 57 located on the right side of the face 55 in FIG. 8. That is, by sequentially selecting the right eye without determining which face the eye belongs to, right eye is selected next to the left eye on the face 55, and the right eye is selected next to the left eye on the right face 57 next to the face 55.

However, as shown in FIG. 13, when a plurality of faces are lined up in the Y-axis direction (vertical direction), the following problems occur. FIG. 13 is a diagram illustrating a state in which a plurality of faces are lined up in the Y-axis direction. In the example of FIG. 13, an eye on the left side facing a face 132 (hereinafter referred to as a left eye) is selected next to an eye on the left side facing a face 131 (hereinafter referred to as a left eye), and an eye on the right side facing the face 131 (hereinafter referred to as a right eye) is selected next to the left eye of the face 132. Therefore, in the present embodiment, the positions of the eyes are rearranged in the X-axis direction with the position of the center of the face as a reference so that the right and left eyes in the same face are sequentially selected and then the right and left eyes in another face are sequentially selected. Specifically, in a case where the central position of the face 131 in the X-axis direction (horizontal direction) is set to C1 and the central position of the face 132 in the X-axis direction (horizontal direction) is set to C2, C2 is located on the right side of C1.

Each time the operation switch 282 is operated in a state where an indication frame 133 is displayed on the left eye of the face 131 (FIG. 13), the body-side control unit 230 selects the right eye of the face 131, selects the left eye of the face 132 next to the right eye of the face 131, and selects the right eye of the face 132 next to the left eye of the face 132. With such a configuration, the right and left eyes in the same face can be selected continuously, and the usability for the user can be improved.

<Vertical Position>

The same applies to a case where the camera system 1 is held in the vertical position as shown in FIG. 12. In the case of the vertical position, the positions of the eyes are rearranged in the Y-axis direction with the position of the center of the face as a reference so that the right and left eyes in the same face are sequentially selected and then the right and left eyes in another face are sequentially selected. Although not shown in the drawing, the central position of a certain face in the Y-axis direction is set to C3, and the central position of another face in the Y-axis direction is set to C4. C4 is assumed to be located on the right side of C3.

Each time the operation switch 284 is operated in a state where an indication frame (an AF frame) is displayed on the left eye of a certain face, the body-side control unit 230 selects the right eye of a certain face, selects the left eye of another face next to the right eye of a certain face, and selects the right eye of another face next to the left eye of another face. With such a configuration, the right and left eyes in the same face can be selected continuously, and the usability for the user can be improved.

According to the first embodiment described above, the following operational effects are obtained.

(1) The camera as an example of an electronic apparatus (the camera system 1) includes the body-side control unit 230 that detects faces and eyes from an image, the body-side control unit 230 that selects one eye from the eyes detected by the body-side control unit 230, and the display unit 290 that displays, superimposed on a live-view image, an indication of an indication frame (an AF frame) indicating the position of the eye selected by the body-side control unit 230 and an indication of a triangle mark indicating that at least any of a face and an eye different from the selected eye is detected by the body-side control unit 230. With such a configuration, it is possible to visually inform the user which eye is selected from the faces and eyes detected from the live-view image.

(2) Since the indication of the triangle mark indicates a direction from the indication of an indication frame (an AF frame) at a position where a face or an eye different from the selected eye is detected, it is possible to visually inform the user in which direction the face or eye other than the selected eye is located from the indication frame (AF frame).

(3) Since the display unit 290 makes the indication aspect of the triangle mark different for the indication of the triangle mark related to the position of a face different from the selected eye and the indication of the triangle mark related to the position of an eye different from the selected eye, it is possible to visually inform the user whether an eye other than the selected eye is detected or a face other than the selected eye is detected.

(4) When a plurality of eyes are detected on a face, the body-side control unit 230 selects one eye on the basis of the size of the detected eye. Therefore, for example, by using the selected eye as a target for focusing, it is possible to obtain an operational effect that focusing is easier than in a case where a small eye is selected.

(5) Since the body-side control unit 230 selects an eye on the basis of the user's operation, it is also possible to meet the user's request to select an eye other than the eye selected by the body-side control unit 230.

(6) The image is generated by capturing a subject image which is formed by the optical imaging system 360. The camera stores information relating to whether the eye selected by the user's operation is a right eye or a left eye with respect to a face having the eye in the storage unit 235. The body-side control unit 230 selects an eye on the basis of the information stored in the storage unit 235 in an image obtained by capturing an image of a frame which is different from the image having the information stored therein. With such a configuration, for example, in a case where a face cannot be detected once in the live-view image and an eye is selected from the face detected again in the subsequent live-view image, it is possible to avoid a situation in which the selected eye is switched each time the face is detected again.

(7) The camera includes the operation switches 281 to 284 that allow the user to select information relating to a direction indicated by the indication of the triangle mark. The body-side control unit 230 newly selects an eye of the same face as the selected eye in a case where there is an eye of the same face as the selected eye in a first direction determined on the basis of information relating to a direction selected by any of the operation switches 281 to 284, and newly selects a face closest to the first direction in a case where there is no eye of the same face as the selected eye. With such a configuration, it is possible to appropriately select the eye or face located in the first direction desired by the user.

(8) The camera includes the touch operation member 290A which is provided on the display surface of the display unit 290 to accept an operation of selecting a portion of the image displayed at an operated position on the display surface by the user touching the display surface. When two eyes are detected with respect to a face which is a portion of the display image selected through the touch operation member 290A, the body-side control unit 230 selects one of the eyes on the basis of the information stored in the storage unit 235. With such a configuration, it is possible to appropriately select an eye desired by the user from the face selected by the touch operation.

(9) Since the storage unit 235 holds the information of the storage unit 235 until at least one of a power-off operation and an operation for the body-side control unit 230 not to perform face or eye detection by, for example, switching of the "AF area mode" is performed, it is possible to appropriately use the information recorded in the storage unit 235 (for example, information indicating that the left eye is selected).

(10) The body-side control unit 230 causes the AF signal processing unit 270b to calculate the amount of defocus at focus points P corresponding to the displayed indication frame. With such a configuration, it is possible to visually inform the user of where in the image to focus.

(11) The body-side control unit 230 determines whether an eye-sized indication frame (an AF frame) is displayed at the position of the detected eye or a face-sized indication frame (an AF frame) is displayed at the position of the detected face in accordance with the size of the detected eye. With such a configuration, it is possible to display an indication frame (an AF frame) having an appropriate size in the image.

(12) The body-side control unit 230 determines whether an AF calculation based on an eye-sized indication frame is performed (S380) or an AF calculation based on a face-sized indication frame is performed (S390) in accordance with the size of the detected eye. With such a configuration, in a case where the eye is small, it is possible to prevent a decrease in the accuracy of calculation of the amount of defocus by performing an AF calculation using the information of not only the eye but also the face.

Second Embodiment

The indication of an indication frame (an AF frame) in a case where the first setting is selected may be performed using a method different from that in the first embodiment. FIG. 14 is a flowchart illustrating a flow of processes for determining an indication frame which are executed by the body-side control unit 230 in a case where the first setting is selected. The body-side control unit 230 determines focus points P used for calculating the amount of defocus described above by executing the processing according to the flowchart of FIG. 14 instead of the processing according to the flowchart of FIG. 11.

FIG. 14 is different from FIG. 11 in that steps S330 and S370 of FIG. 11 are omitted, and that steps S345 and S370A of FIG. 14 are added instead. Therefore, a description will be given with focus on these differences.

In step S345 to which the process proceeds after an affirmative determination in step S340, the body-side control unit 230 calculates a distance R from the position of the detected face to the position of detected eye on the face. FIG. 15 is a schematic diagram illustrating calculation of the distance R. In FIG. 15, the position of a detected face 161 is, for example, a central position (centroid position) CA in the range of the detected face 161, and the position of a detected eye 162 is, for example, a central position (centroid position) CB in the range of the detected eye 162. The distance R is a distance between the point CA and the point CB in FIG. 15.

In step S370A following step S345, the body-side control unit 230 determines whether the distance R is larger than a threshold determined in advance. For example, in a case where the distance R is larger than R'×k1 obtained by multiplying the length R' of the eye in the X-axis direction (horizontal direction) by a coefficient k1, the body-side control unit 230 makes an affirmative determination in step S370A and proceeds to step S380. In a case where the distance R is equal to or less than R'×k1 which is a threshold, the body-side control unit 230 makes a negative determination in step S370A and proceeds to step S390.

In a case where the distance R is short, there is a high possibility of the eye having been erroneously detected. In the present embodiment, the reliability of the detected eye is evaluated by calculating the distance R.

In the above description, the distance R is a distance from the central position CA of the detected face 161 to the central position CB of the detected eye 162 on the face 161, but may be the distance R' (FIG. 15) between the central positions of the right and left eyes detected in the detected face 161.

In addition, for the distance R described above (or the distance R'), instead of comparing the product of the length R' of the eye in the X-axis direction (horizontal direction) and the coefficient k1, the ratio of the distance R (or the distance R') to the horizontal direction of the live-view image may be compared with a threshold X1 determined in advance.

In addition, the number of pixels A of the detected eye in the X-axis direction may be compared with a threshold determined in advance to make a determination based on an absolute value.

According to the second embodiment describes above, the following operational effects are obtained.

The body-side control unit 230 calculates the distance R from the central position CA of the face 161 detected in the image to the central position CB of the eye 162 detected in the face 161. Depending on the distance R, it is determined whether to perform the AF calculation based on an eye-sized indication frame (an AF frame) (S380) or to perform the AF calculation based on a face-sized indication frame (S390). With such a configuration, similarly to the case of the first embodiment, it is possible to prevent a decrease in the accuracy of calculation of the amount of defocus by performing an AF calculation using the information of not only the eye but also the face.

The following modifications also fall within the scope of the present invention, and one or a plurality of modification examples can also be combined with the above-described embodiment.

Modification Example 1

In the above, an example in which the body-side control unit 230 that has detected the right and left eyes selects the larger of the eyes on the basis of the size of the eyes has been described. In a case where direction information indicating whether the face is turned to the right or turned to the left with respect to the camera system 1 is obtained, the body-side control unit 230 may select one eye closer to the camera system 1 on the basis of the information on the direction of the face.

Parts (a) and (b) of FIG. 16 show diagrams illustrating an example in which the face is turned to the right with respect to the camera system 1. In both the case where an eye on the left side facing the face (hereinafter referred to as a left eye) is larger than an eye on the right side facing the face (hereinafter referred to as a right eye) (FIG. 16(*a*)) and the case where the left eye is smaller than the right eye (FIG. 16(*b*)), the body-side control unit 230 selects one left eye closer to the camera system 1 on the basis of the information on the direction of the face, and displays the indication frame 51 on the selected left eye.

Generally, a difference between the sizes of the detected right and left eyes is often small, and thus in a case where the larger of the eyes is attempted to be selected, the selected eye may frequently switch between the right and left. By referring to the information on the direction of the face, it is possible to prevent a decrease in the usability for the user due to frequent switching of the selected eye.

FIG. 16(*c*) shows a diagram illustrating an example in which the face is turned to the left with respect to the camera system. In a case where the information on the direction of the face changes, the body-side control unit 230 selects one right eye closer to the camera system 1 again on the basis of new direction information, and displays the indication frame 71 on the selected left eye (FIG. 16(*c*)).

Modification Example 2

In a case where a face or an eye is detected from a live-view image as described above, the search range of the face (eye) may be changed during single shooting and continuous shooting. The single shooting is an image capturing mode in which an image of one frame is captured when the release button is fully pressed. The continuous shooting is an image capturing mode in which an image of one frame is continuously captured for a plurality of frames while the release button is fully pressed.

Generally, it is desirable to start image capturing of the next frame earlier during continuous shooting. On the other hand, in a case where a face (eye) is searched for from a live-view image, the face (eye) is searched for in a narrow range rather than the face (eye) is searched for in a wide range, but the processing time is shortened. Consequently, the body-side control unit 230 sets the range in which the face (eye) is detected during continuous shooting to, for example, 70 percent of the range of the live-view image. By narrowing the range and shortening the processing time in which the face (eye) is searched for, it is possible to start image capturing of the next frame earlier and to improve the speed of continuous shooting.

The body-side control unit 230 sets, for example, 70 percent of the range of the live-view image centering on the position of the face (eye) detected in the previous frame, and thus can appropriately follow the face (eye) detected in the previous frame while shortening the processing time in which the face (eye) is searched for. In addition, when setting the search range in which the eye is searched for centering on the position of the eye detected in the previous frame, the range may be 50 percent of the range of the live-view image.

Meanwhile, the body-side control unit 230 sets the range in which the face (eye) is detected during single shooting to 100 percent of the range of the live-view image. This is to detect the face (eye) appropriately using a wide range of the live-view image.

Modification Example 3

The body-side control unit 230 can include the information acquired in the AF operation (S60) in a file recorded in the recording process (S110). For example, information indicating the size or position of the detected face, information indicating the size or position of the detected right and left eyes, information indicating reliability during detection, information indicating whether the eye for which the indication frame is set is selected by the determination of the body-side control unit 230 or selected on the basis of the user's operation, information indicating whether the face for which the indication frame is set is selected by the determination of the body-side control unit 230 or selected on the basis of the user's operation, and the like are recorded in a file together with image data for recording.

Modification Example 4

Although a method using the phase difference detection method has been exemplified as the focus detection method in the above-described embodiment, the contrast method may be adopted. In a case where the contrast method is adopted, on the imaging surface 260S, focus detection is performed by calculating an evaluation value for evaluating the contrast of high-frequency components of an image on the basis of a pixel signal for image capturing which is output from pixels disposed at positions corresponding to the indication frame or a pixel signal for image capturing which is output from pixels disposed at positions corresponding to the inside of the indication frame and the periphery of the indication frame.

In addition, focus detection using the contrast method may be performed in a case where the size of the detected eye is smaller than a predetermined value, and focus detection using the phase difference detection method may be performed in a case where the size of the detected eye is larger than the predetermined value. In this manner, in a case where the size of the detected eye is small or a case where focus points P are not disposed at a position corresponding to the detected eye, it is possible to perform focus detection appropriately by performing focus detection using the contrast method.

Modification Example 5

In the above-described embodiment, the face is first detected, and then the eye of the detected face is detected. However, in a case where the face cannot be detected, the shape of the head may be detected, and then the eye may be detected. Specifically, the shapes of the face, eye, and head are detected in a plurality of images which are continuously generated, and the position and size thereof are stored for each image. Further, relative information which is the relative position and relative size of each of the shapes of the face, eye, and head is stored. In a case where the face cannot be detected, the shape of the head is first detected, and the position and size of the eye are detected using the position and size of the shape of the detected head and the stored relative information. In a case where the shape of the head cannot be detected in one image, tracking detection may be performed using the position and size of the shape of the head in the past image. In addition, in a case where the shapes of the face and head cannot be detected, the pattern of the image including the color when the face is detected may be stored as a feature amount, the feature amount may be searched for a similar region in the image, and the position and size of the eye may be detected using the stored relative information. Tracking detection may be performed using the position and size of a similar region in the image of the feature amount of the past image.

Thus, by displaying the indication frame at a position where the eye is presumed to be present even in a case where the face cannot be detected, it is possible to prevent the indication frame of the eye from being displayed or not being displayed in an image in which the eye can be detected and an image in which the eye cannot be detected. That is, it is possible to prevent the eye frame from being displayed or not being displayed for each frame of a through image which is continuously displayed.

Modification Example 6

A value obtained by averaging the position and size of a face detected in the latest frame (an image generated by performing image capturing at predetermined time intervals is referred to as a frame) and the direction angle of the face with the position and size of the face detected in the previous frame and the direction angle of the face may be calculated (weighted average, lowering the weight for older frames, or the like), and eye detection may be performed on the basis of the averaged position, size, and angle of the face.

Since the position, size, and angle of face detection vary between frames due to the shaking of an imaging device, it is possible to prevent the selected eyes (right and left) from changing due to a change in the position or direction of the selected face.

In a case where the face or eye of a person different from a person of the face or eye detect in the latest frame is selected, a case where the face or eye is detected after a predetermined time has elapsed from the detection of the face or eye in the previous frame, or a case where the position of the detected face changes significantly, averaging may be performed in frames imaged after a new frame without averaging the position, size, and angle of the face detected in the latest frame and the position, size, and angle of the face detected before that.

In the above description, the case where the face or eye is detected after a predetermined time has elapsed from the previous detection of the face or eye is a case where the face or eye cannot be detected for a predetermined number of frames after the face or eye is detected, and the face or eye can be detected again after a predetermined number of frames.

Modification Example 7

A value obtained by averaging the size of the eye detected in the current frame and the position of the eye with the size of the eye detected in the previous frame and the position of the eye may be calculated (weighted average, lowering the weight for older frames, or the like), and the indication frame may be displayed.

Thus, it is possible to prevent a change in the size of the indication frame or a shift in its position between frames.

In a case where the face or eye of a person different from a person of the currently detected face or eye is selected, a case where an eye different from the currently detected eye is selected, a case where the eye is detected after a predetermined time has elapsed from the previous eye detection, or a case where the position of detection of the eye is shifted significantly, averaging may be performed in frames imaged after a new frame without averaging the position and size of the eye detected in the current frame and the position and size of the eye detected before that.

Modification Example 8

Whether the indication frame is displayed on the face or the indication frame is displayed on the eye may be changed depending on whether the size of the detected face is larger or smaller than a reference value. In addition, the reference value may be changed in the case of the change from the indication of the indication frame of the face to the indication of the indication frame of the eye and vice versa. For example, the indication frame is displayed on the eye in a case where the size of the face is equal to or more than 50 pixels in captured image data, and the indication frame is displayed on the face in a case where the size of the face is smaller than 50 pixels in the captured image data.

When the size of the face is equal to or more than 55 pixels in the captured image data in a case where the indication frame is displayed on the face in the previous frame, the indication of the indication frame of the face is changed to the indication of the indication frame of the eye. On the contrary, when the size of the face is equal to or less than 45 pixels in the captured image data in a case where the indication frame is displayed on the eye in the previous frame, the indication of the indication frame of the eye is changed to the indication of the indication frame of the face. That is, the reference of the size of the face in a case where the indication of the indication frame of the face is changed to the indication of the indication frame of the eye and the reference of the size of the face in a case where the indication of the indication frame of the eye is changed to the indication of the indication frame of the face may be made different from each other.

Thus, in a case where the size of the eye changes slightly, it is possible to prevent the indication of the indication frame of the face and the indication of the indication frame of the eye from being frequently changed between images which are continuously displayed with the elapse of time.

Modification Example 9

In the above-described embodiment, an example in which the face or eye is detected and the focusing state of the detected face or eye is detected has been illustrated, but there is no limitation thereto. For example, a portion of an image selected by the user from the captured and acquired image may be registered as a feature object, the registered feature object may be detected from image data, and its focusing state may be detected. Alternatively, in addition to the eye, objects that can be detected such as lips, soccer balls, food, or rings may be able to be set by a camera. In addition, in a case where the camera has image capturing modes corresponding to a plurality of scenes, a target for detecting its focusing state may be changed in accordance with the image capturing modes. Specifically, an eye may be detected and the focusing state of the detected eye may be detected in a case where the image capturing mode of the camera is a portrait mode, and a ball may be detected and the focusing state of the detected ball may be detected in a case where it is a sport mode. In the case of food, the plate of a birthday cake, a candle, or a main dish may be detected.

The present invention is not limited to the above-described content. Other aspects that can be considered to fall within the technical idea of the present invention are also included in the scope of the present invention.

Priority is claimed on Japanese Patent Application No. 2018-248622, filed Dec. 28, 2018, the content of which is incorporated herein by reference.

REFERENCE SIGNS LIST

1 Camera system
2 Camera body
3 Interchangeable lens
230 Body-side control unit
235 Storage unit
40, 41, 51, 59, 71, 81, 84A, 133 Indication frame
52, 53, 72, 73, 82, 83, 85 Triangle mark
270 Signal processing unit
280, 281 to 284 Operation member
290 Display unit
290A Touch operation member
360 Optical imaging system
370 Lens driving unit

The invention claimed is:

1. An electronic apparatus comprising:
a microcomputer programmed to:
   detect eyes and faces from an image; and
   select an eye from the detected eyes; and
a display that displays simultaneously a first indication and a second indication, the first indication indicating the selected eye, the second indication indicating that at least one of another eye and another face is detected, the other eye being different from the eye indicated by the first indication, and the other face being different from a face having the eye indicated by the first indication.

2. The electronic apparatus according to claim 1, wherein the second indication indicates information about a position, in the image, of an eye or a face that is a target to be selected by the microcomputer.

3. The electronic apparatus according to claim 1, wherein in a case where an eye that is a target to be selected by the microcomputer is detected, the display displays the second indication with an aspect that is different from that in a case where a face is a target to be selected by the microcomputer.

4. The electronic apparatus according to claim 1, wherein the microcomputer is programmed to select an eye based on an operation by a user,
the image is generated by capturing an image of a subject formed by an optical system,
the electronic apparatus further comprises a memory that storages information about whether the eye selected by the operation of the user is a right eye or a left eye for a face having the selected eye, and
the microcomputer is programmed to select the eye, in an image based on the capture that is different from that for the image of which the information is stored, based on the information stored in the memory.

5. The electronic apparatus according to claim 1, further comprising:
a first operation unit that is for a user's operation of indication based on the second indication, wherein
in a case where another eye in the same face as the face having the selected eye is found in a first direction indicated by the operation with the first operation unit, the microcomputer is programmed to newly select the other eye in the same face as the face having the selected eye, and
in a case where another eye in the same face as the face having the selected eye is not found in the first direction, the microcomputer is programmed to newly select a face that has a closest distance in the first direction or newly select an eye of a face that has a closest distance in the first direction.

6. The electronic apparatus according to claim 5, further comprising:
a second operation unit that has a portion provided on a display face of the display and accepts a second operation of selecting a part of the image that is displayed at an operated position on the display face by a user's operation to the display face, wherein
the microcomputer is programmed to select, based on the information stored in the memory, an eye among two eyes when the two eyes are detected with respect to a face that is selected by the second operation by the user.

7. The electronic apparatus according to claim 4, wherein the memory stores the information until at least one of a power-off operation and an operation for the microcomputer not to perform detection is performed.

8. The electronic apparatus according to claim 1, further comprising:
an imaging unit that captures an image of a subject formed via an optical system and outputs a signal; and
an image generator that generates the image based on the signal, wherein
the microcomputer is programmed to detect a focusing state of the image, via the optical system, corresponding to the first indication.

9. An electronic apparatus comprising:
a microcomputer programmed to:
   detect first feature portions and second feature portions from an image; and
   select one of the first feature portions from the detected first feature portions; and
a display that displays simultaneously a first indication, which indicates the selected first feature portion, and a second indication, which indicates information relating to a direction in which a said first feature portion or a said second feature portion that is capable of being selected in addition to the selected first feature portion is located, the first indication and the second indication being displayed with aspects respectively that are different from each other between a case where the first feature portion that is capable of being selected is detected and a case where the second feature portion that is capable of being selected is detected.

10. An imaging apparatus comprising:
an imaging unit that captures an image of a subject using a flux of light transmitted through an optical system and outputs a signal;
an image generation unit that generates an image based on the signal;

a microcomputer programmed to detect a face and an eye from the image;
a display that displays an indication that indicates at least one of the face and the eye detected by the microcomputer, wherein
the microcomputer detects a focus state of an image captured via the optical system based on at least one of the face and the eye detected by the microcomputer,
when the microcomputer determines that an index value of at least one of a size of the eye and a size of the face in the image is smaller than a first threshold, the indication displayed by the display indicates the detected face and the microcomputer detects the focus state based on the detected face,
when the microcomputer determines that the index value is larger than the first threshold and smaller than a second threshold, the indication displayed by the display indicates the detected eye and the microcomputer detects the focus state based on the detected face, and
when the microcomputer determines that the index value is larger than the second threshold, the indication displayed by the display indicates the detected eye and the microcomputer detects the focus state based on the detected eye.

11. The imaging apparatus according to claim 10, wherein the index is a size of eye in the image, a distance between a centroid position of a face and a centroid position of an eye in the image, a distance between a right eye and a left eye in the image, or a ratio of the face to the image.

12. A computer-readable non-transitory storage medium storing a program for causing a computer to:
detect eyes and faces from an image;
select an eye from the detected eyes; and
display simultaneously a first indication and a second indication, the first indication indicating the selected eye, the second indication indicating that at least one of another eye or another face is detected, the other eye being different from the selected eye indicated by the first indication, and the other face being different from a face having the selected eye indicated by the first indication.

* * * * *